(12) United States Patent
Weitz et al.

(10) Patent No.: US 11,559,806 B2
(45) Date of Patent: Jan. 24, 2023

(54) ACOUSTIC WAVE SORTING

(71) Applicant: President and Fellows of Harvard College, Cambridge, MA (US)

(72) Inventors: David A. Weitz, Bolton, MA (US); Warren Lloyd Ung, Richmond (CA); Thomas Franke, Augsburg (DE)

(73) Assignee: President and Fellows of Harvard College, Cambridge, MA (US)

(*) Notice: Subject to any disclaimer, the term of this patent is extended or adjusted under 35 U.S.C. 154(b) by 266 days.

(21) Appl. No.: 15/755,189

(22) PCT Filed: Aug. 25, 2016

(86) PCT No.: PCT/US2016/048513
§ 371 (c)(1),
(2) Date: Feb. 26, 2018

(87) PCT Pub. No.: WO2017/035287
PCT Pub. Date: Mar. 2, 2017

(65) Prior Publication Data
US 2018/0257076 A1    Sep. 13, 2018

Related U.S. Application Data

(60) Provisional application No. 62/210,899, filed on Aug. 27, 2015.

(51) Int. Cl.
*G01N 15/02* (2006.01)
*B01L 3/00* (2006.01)

(52) U.S. Cl.
CPC ... *B01L 3/502761* (2013.01); *B01L 3/502715* (2013.01); *B01L 2200/0636* (2013.01);
(Continued)

(58) Field of Classification Search
CPC .................................. B01L 3/00; G01N 15/02
(Continued)

(56) References Cited

U.S. PATENT DOCUMENTS 5,164,094 A   11/1992   Stuckart
5,512,131 A    4/1996   Kumr et al.
(Continued)

FOREIGN PATENT DOCUMENTS

CN    101099727 A    1/2008
CN    102120585 A    7/2011
(Continued)

OTHER PUBLICATIONS

Hawkes, J. J. et al, Sensors and Actuators B 2001, 75, 213-222.*
(Continued)

*Primary Examiner* — Arlen Soderquist
(74) *Attorney, Agent, or Firm* — Wolf, Greenfield & Sacks, P.C.

(57) ABSTRACT

The present invention generally relates to the manipulation of species using acoustic waves such as surface acoustic waves. In some aspects, a channel such as a microfluidic channel may be provided having two or more outlets, and acoustic waves applied to species within the channel to determine which outlet the species is directed to. For instance, surface acoustic waves may be applied to a species such as a cell or a particle to deflect it from the channel into a groove or other portion that directs it to a different outlet. In some cases, surprisingly, this deflection of species may be in a different direction than the incident acoustic waves on the channel. Other embodiments of the present invention are generally directed to kits including such systems, techniques for producing such systems, or the like.

15 Claims, 6 Drawing Sheets

(52) U.S. Cl.
CPC ............... *B01L 2200/0652* (2013.01); *B01L 2300/0816* (2013.01); *B01L 2400/0436* (2013.01); *B01L 2400/086* (2013.01); *G01N 15/0255* (2013.01)

(58) Field of Classification Search
USPC .......................................... 422/502; 436/165
See application file for complete search history.

(56) References Cited

U.S. PATENT DOCUMENTS

| | | | |
|---|---|---|---|
| 5,688,405 A | 11/1997 | Dickinson et al. | |
| 6,355,198 B1 | 3/2002 | Kim et al. | |
| 6,777,245 B2 | 8/2004 | Wixforth | |
| 6,852,547 B2* | 2/2005 | Garcia | B03C 1/01 422/50 |
| 7,708,949 B2 | 5/2010 | Stone et al. | |
| 7,942,568 B1 | 5/2011 | Branch et al. | |
| 8,122,909 B2* | 2/2012 | Tonkovich | B01F 5/0611 137/833 |
| 8,573,060 B2 | 11/2013 | Huang et al. | |
| 8,765,485 B2 | 7/2014 | Link et al. | |
| 9,038,919 B2 | 5/2015 | Link et al. | |
| 9,512,421 B1 | 12/2016 | Branch et al. | |
| 9,597,692 B2* | 3/2017 | Bernate | B01L 3/502753 |
| 9,695,390 B2 | 7/2017 | Weitz et al. | |
| 10,258,987 B2 | 4/2019 | Weitz et al. | |
| 10,758,905 B2 | 9/2020 | Ai et al. | |
| 11,040,347 B2 | 6/2021 | Foster et al. | |
| 11,077,441 B2 | 8/2021 | Craig et al. | |
| 11,084,036 B2 | 8/2021 | Bharadwaj et al. | |
| 11,229,911 B2 | 1/2022 | Weitz et al. | |
| 2001/0055529 A1 | 12/2001 | Wixforth | |
| 2002/0009015 A1 | 1/2002 | Laugharn et al. | |
| 2003/0064400 A1* | 4/2003 | Williams | C12Q 1/6834 435/6.12 |
| 2004/0069717 A1 | 4/2004 | Laurell et al. | |
| 2004/0126903 A1* | 7/2004 | Garcia | B03C 1/01 436/526 |
| 2004/0266022 A1* | 12/2004 | Sundararajan | B01F 33/3011 436/180 |
| 2005/0148064 A1* | 7/2005 | Yamakawa | B01L 61/18 435/287.2 |
| 2005/0172476 A1 | 8/2005 | Stone et al. | |
| 2005/0207940 A1* | 9/2005 | Butler | G01N 15/1459 422/403 |
| 2006/0163385 A1 | 7/2006 | Link et al. | |
| 2006/0266692 A1* | 11/2006 | Foster | B01D 61/14 210/321.84 |
| 2007/0003442 A1 | 1/2007 | Link et al. | |
| 2007/0017633 A1* | 1/2007 | Tonkovich | B01F 5/0611 156/300 |
| 2007/0125941 A1 | 6/2007 | Lee et al. | |
| 2007/0206055 A1 | 9/2007 | Zapka et al. | |
| 2007/0263485 A1* | 11/2007 | Yang | B01F 5/061 366/336 |
| 2009/0107909 A1* | 4/2009 | Kotera | B01L 3/502761 210/513 |
| 2009/0201504 A1* | 8/2009 | Ho | B01L 3/502761 356/399 |
| 2009/0226994 A1 | 9/2009 | Lemor et al. | |
| 2010/0126922 A1* | 5/2010 | Takahashi | B01L 3/502753 210/201 |
| 2010/0139377 A1 | 6/2010 | Huang et al. | |
| 2010/0193407 A1* | 8/2010 | Steinberg | B01L 3/502776 209/155 |
| 2010/0200092 A1 | 8/2010 | Beltram et al. | |
| 2010/0248064 A1 | 9/2010 | La O' et al. | |
| 2010/0300942 A1* | 12/2010 | Sulchek | B01D 45/14 209/132 |
| 2010/0323342 A1* | 12/2010 | Gonzalez | A61M 1/3678 435/5 |
| 2011/0032528 A1 | 2/2011 | Charette | |
| 2011/0127164 A1 | 6/2011 | Sinha et al. | |
| 2011/0154890 A1* | 6/2011 | Holm | B01D 21/283 73/61.75 |
| 2011/0275143 A1 | 11/2011 | Prakash et al. | |
| 2011/0277848 A1 | 11/2011 | Burns et al. | |
| 2012/0145890 A1 | 6/2012 | Goodlett et al. | |
| 2012/0146457 A1 | 6/2012 | Goto et al. | |
| 2012/0149126 A1 | 6/2012 | Wilson et al. | |
| 2012/0160746 A1 | 6/2012 | Thorslund et al. | |
| 2012/0315203 A1* | 12/2012 | Baroud | B01L 3/502784 422/503 |
| 2013/0043170 A1* | 2/2013 | Rose | B01L 3/502761 209/659 |
| 2013/0192958 A1 | 8/2013 | Ding et al. | |
| 2013/0213488 A1 | 8/2013 | Weitz et al. | |
| 2013/0236901 A1 | 9/2013 | Potier et al. | |
| 2014/0008307 A1 | 1/2014 | Guldiken et al. | |
| 2014/0033808 A1* | 2/2014 | Ding | G01N 29/02 73/61.75 |
| 2014/0161685 A1* | 6/2014 | Lee | B01F 33/302 422/502 |
| 2014/0174994 A1* | 6/2014 | Bernate | B01L 3/502753 209/155 |
| 2014/0227777 A1* | 8/2014 | Choi | B01L 3/502761 435/309.1 |
| 2015/0024373 A1* | 1/2015 | Xia | F04B 19/006 435/308.1 |
| 2015/0114093 A1* | 4/2015 | Appleyard | G01N 15/1484 73/61.59 |
| 2015/0192546 A1 | 7/2015 | Weitz et al. | |
| 2015/0298157 A1 | 10/2015 | Weitz et al. | |
| 2017/0246634 A1 | 8/2017 | Weitz et al. | |
| 2017/0321177 A1 | 11/2017 | Weitz et al. | |
| 2019/0211293 A1 | 7/2019 | Weitz et al. | |
| 2021/0039105 A1 | 1/2021 | Mutafopulos et al. | |
| 2022/0212194 A1 | 7/2022 | Weitz et al. | |

FOREIGN PATENT DOCUMENTS

| | | |
|---|---|---|
| CN | 104195028 | 12/2014 |
| EP | 1398025 A1 | 3/2004 |
| EP | 1 905 427 A1 | 4/2008 |
| EP | 2014280 A1 | 1/2009 |
| JP | H02-503528 T | 10/1990 |
| JP | 7304997 A | 11/1995 |
| JP | H10-082723 A | 3/1998 |
| JP | 2004-085323 A | 3/2004 |
| JP | 2004-161739 A | 6/2004 |
| JP | 4472002 B2 | 6/2010 |
| JP | 2010-252785 A | 11/2010 |
| JP | 2011-185839 A | 9/2011 |
| JP | 2012-501437 A | 1/2012 |
| JP | 2015-058394 A2 | 3/2015 |
| JP | 2015-512766 T | 4/2015 |
| KR | 10-1442486 B1 | 9/2014 |
| WO | WO 1996/29629 A2 | 9/1996 |
| WO | WO 1998/06667 A1 | 2/1998 |
| WO | WO 01/05731 A1 | 1/2001 |
| WO | WO 2001/89787 A2 | 11/2001 |
| WO | WO 2004/002627 A2 | 1/2004 |
| WO | WO 2004/048356 A1 | 6/2004 |
| WO | WO 2004/091763 A2 | 10/2004 |
| WO | WO 2005/021151 A1 | 3/2005 |
| WO | WO 2005/037267 A1 | 4/2005 |
| WO | WO 2007/128045 A1 | 11/2007 |
| WO | WO 2007/141002 A1 | 12/2007 |
| WO | WO 2008/000042 A1 | 1/2008 |
| WO | WO 2008/072155 A1 | 6/2008 |
| WO | WO 2009/077147 A2 | 6/2009 |
| WO | WO 2010/024753 A1 | 3/2010 |
| WO | 2010/123453 | * 10/2010 |
| WO | WO 2010/121328 A1 | 10/2010 |
| WO | WO 2012/027366 A2 | 3/2012 |
| WO | WO 2012/098140 A1 | 7/2012 |
| WO | WO 2012/135259 A1 | 10/2012 |
| WO | WO 2014/004630 A1 | 1/2014 |
| WO | WO 2014/022268 A1 | 2/2014 |

(56) References Cited

FOREIGN PATENT DOCUMENTS

| | | |
|---|---|---|
| WO | WO 2014/066624 A1 | 5/2014 |
| WO | WO 2014/142924 A1 | 9/2014 |

OTHER PUBLICATIONS

Ismagilov, R. F. et al, Analytical Chemistry 2001, 73, 4682-4687.*
Johnson, T. J. et al, Analytical Chemistry 2002, 74, 45-51.*
Chung, S. et al, Microsystem Technologies 2003, 9, 525-533.*
Kumar, M. et al, Biotechnology and Bioengineering 2005, 89, 129-137.*
Kapishnikov, S. et al, ournal of Statistical Mechanics: Theory and Experiment 2006, paper P01012, 15 pages.*
Laurell, T. et al, Chemical Society Reviews 2007, 36, 492-506.*
Evander, M. et al, Analytical Chemistry 2007, 79, 2984-2991.*
Choi, S et al, Lab on a Chip 2007, 7, 890-897.*
Petersson, F. et al, Analytical Chemistry 2007, 79, 5117-5123.*
Choi, S. et al, Analytical Chemistry 2008, 80, 3035-3039.*
Howell, P. B. et al, Lab on a Chip 2008, 8, 1097-1103.*
Hsu, C.-H. et al, Lab on a Chip 2008, 8, 2128-2134.*
Choi, S. et al, Analytical Chemistry 2009, 81, 50-55.*
Choi, S. et al, Analytical Chemistry 2009, 81, 1964-1968.*
Hoi, S.-K. et al, Applied Physics B 2009, 97, 859-865.*
Chen, H.-H. et al, Proceedings of the ASME 2009 2nd Micro/Nanoscale Heat & Mass Transfer International Conference 2009, MNHMT2009-18394, 6 pages.*
Yantchev, V. et al, Journal of Micromechanics and Microengineering 2010, 20, paper 035031, 5 pages.*
Mao, W. et al, Physics of Fluids 2011, 23, paper 051704, 4 pages.*
Orloff, N. D. et al, Biomicrofluidics 2011, 5, paper 044107, 9 pages.*
Choi, S. et al, Lab on a Chip 2012, 12, 1427-1430.*
Augustsson,, P. et al, Analytical Chemistry 2012, 84, 7954-7962.*
Ding, X. et al, Lab on a Chip 2012, 12, 4228-4231.*
Chung , A. J. et al, Small 2013, 9, 685-690.*
Destgeer, G. et al, Lab on a Chip 2013, 13, 4210-4216.*
Geislinger, T. M. et al, Biomicrofluidics 2013, 7, paper 044120, 9 pages.*
Song, S. et al, Cytometry Part A 2013, 83A, 1034-1040.*
Munir, A. et al, IET Nanobiotechnology 2014, 8, 102-110.*
Choi, S. et al, Lab on a Chip 2014, 14, 161-166.*
Chen, Y. et al, Small 2014, 10, 1746-1751.*
Jakobsson, O. et al, Lab on a Chip 2014, 14, 1943-1950.*
Yan, S. et al, Scientific Reports 2014, 4, paper 5060, 8 pages.*
Witte, C. et al, Lab on a Chip 2014, 14, 4277-4283.*
Destgeer, G. et al, Lab on a Chip 2014, 14, 4665-4672.*
Sesen, M. et al, Lab on a Chip 2015, 15, 3030-3038.*
Chen, H.-H. et al, Applied Physics Letters 2008, 92, paper 173502, 3 pages.*
Collins, D. J. et al, Lab on a Chip 2014 014, 14, 1595-1603.*
Behrens, J. et al, 2015, 15, 43-46.*
Chen, H.-H. et al, Journal of Biomechanical Engineering 2009, 131, paper 074505, 4 pages.*
Hoi, S.-K. et al, SPIE 2010, 7593, paper 759313, 10 pages.*
Wang, H. et al, Journal of Micromechanics and Microengineering 2003, 13, 801-808.*
Narayanan, N. et al, Lab on a Chip 2006, 6, 105-114.*
Neild, A. et al, Journal of Micromechanics and Microengineering 2006, 16, 1562-1570.*
Choi, S. et al, Lab on a Chip 2007, 7, 1532-1538.*
Choi, S. et al, Lab on a Chip 2009, 9, 1962-1965.*
Choi, S. et al, Lab on a Chip 2011, 11, 413-418.*
Adams, J. D. et al, Journal of Micromechanics and Microengineering 2012, 22, paper 075017, 8 pages.*
Masaeli,, M. et al, Physical Review X 2012, 2, paper 031017, 13 pages.*
Kim, K. et al, Microfluidicsand Nanofluidics 2014, 16, 159-166.*
Song, S. et al, Journal of Micromechanics and Microengineering 2014, 24, paper 025007, 7 pages.*
Song, S. et al, Applied Physics Letters 2014, 104, paper 074106, 4 pages.*
Schmid, L. et al, Lab on a Chip 2014, 14, 3710-3718.*
Ding, X. et al, Proceeding of the National Academy of Sciences of the United States of Amenrica 2014, 111, 12992-12997.*
Yan, S. et al, Electrophoresis 2015, 36, 284-291.*
Partial European Search Report dated Jul. 11, 2017 for Application No. EP 11820522.8.
Extended European Search Report dated for Application No. 11820522.8 dated Oct. 13, 2017.
International Search Report and Written Opinion dated Apr. 10, 2012 for Application No. PCT/US2011/048804.
International Preliminary Report on Patentability dated Mar. 7, 2013 for Application No. PCT/US2011/048804.
International Search Report and Written Opinion dated Sep. 9, 2013 for Application No. PCT/US2013/047829.
International Preliminary Report on Patentability dated Jan. 8, 2015 for Application No. PCT/US2013/047829 dated Jan. 8, 2015.
International Search Report and Written Opinion dated Mar. 11, 2014 for Application No. PCT/US2013/066591.
International Preliminary Report on Patentability for Application No. PCT/US2013/066591 dated May 7, 2015.
International Search Report and Written Opinion for Application No. PCT/US2015/037662 dated Sep. 18, 2015.
International Preliminary Report on Patentability for Application No. PCT/US2015/037662 dated Jan. 5, 2017.
International Search Report and Written Opinion for Application No. PCT/US2016/048513 dated Nov. 4, 2016.
International Preliminary Report on Patentability for Application No. PCT/US2016/048513 dated Mar. 8, 2018.
Abate et al., High-throughput injection with microfluidics using picoinjectors. Proc Natl Acad Sci U S A. Nov. 9, 2010;107(45):19163-6. doi: 10.1073/pnas.1006888107. Epub Oct. 20, 2010.
Angell et al., Silicon Micromechanical Devices. Scientific American. Apr. 1, 1983;248:44-55.
Collins et al., The particle valve: On-demand particle trapping, filtering, and release from a microfabricated polydimethylsiloxane membrane using surface acoustic waves. Applied Physics Letters. Jul. 2014;105:33509.
Duffy et al., Rapid Prototyping of Microfluidic Systems in Poly(dimethylsiloxane). Anal Chem. Dec. 1, 1998;70(23):4974-84. doi: 10.1021/ac980656z.
Franke et al., Surface acoustic wave (SAW) directed droplet flow in micro fluidics for PDMS devices. Lab Chip. Sep. 21, 2009;9(18):2625-7.
Franke et al., Surface acoustic wave actuated cell sorting (SAWACS). Lab Chip. Mar. 21, 2010;10(6):789-94.
Ravula et al., A microfluidic system combining acoustic and dielectrophoretic particle preconcentration and focusing. Sensors and Actuators B: Chemical. 2008;130(2):645-52.
Schmid et al., Acoustic modulation of droplet size in a T-junction. Applied Physics Letters. Mar. 31, 2014;104(13):133501-4. DOI: 10.1063/1.4869536.
Schmid et al., Novel surface acoustic wave (SAW)-driven closed PDMS flow chamber. Microfluidics and Nanofluidics. Jan. 2012;12(1-4):229-35.
Schmid et al., SAW-controlled drop size for flow focusing. Lab Chip. May 7, 2013;13(9):1691-4. doi: 10.1039/c3lc41233d.
Shi et al., Focusing microparticles in a microfluidic channel with standing surface acoustic waves (SSAW). Lab Chip. Feb. 2008;8(2):221-3.
Skowronek et al., Particle deflection in a poly(dimethylsiloxane) microchannel using a propagating surface acoustic wave: size and frequency dependence. Anal Chem. Oct. 15, 2013;85(20):9955-9. doi: 10.1021/ac402607p. Epub Sep. 20, 2013.
Tsutsui et al., Cell Separation by Non-Inertial Force Fields in Microfluidic Systems. Mech Res Commun. Jan. 1, 2009;36(1):92-103.
Wood et al., Formation and manipulation of two-dimensional arrays of micron-scale particles in microfluidic systems by surface acoustic waves. Applied Physics Letters. 2009;94(5):054101.
Australian Examination Report for Application No. AU 2016311341 dated Jan. 22, 2020.

(56) References Cited

OTHER PUBLICATIONS

Chinese Office Action dated Nov. 15, 2019 for Application No. 201680059383.7.
Partial European Search Report dated Feb. 1, 2019 for Application No. EP 16840074.5.
Extended European Search Report dated May 6, 2019 for Application No. EP 16840074.5.
European Office Action for Application No. 16840074.5 dated Feb. 18, 2020.
Japanese Office Action for Application No. 2018-510770 dated Apr. 2, 2019.
Chinese Office Action dated Jul. 24, 2020 and received Aug. 17, 2020 for Application No. 201680059383.7.
European Office Action dated Oct. 14, 2020 for Application No. EP 16840074.5.
Chinese Office Action dated Mar. 3, 2021 for Application No. 201680059383.7.
Japanese Office Action for Application No. 2020-018064 dated Jan. 12, 2021.
Chinese Office Action dated Jul. 7, 2021 for Application No. CN 201680059383.7.
Bourquin et al., Tuneable surface acoustic waves for fluid and particle manipulations on disposable chips. Lab Chip. Aug. 7, 2010;10(15):1898-901. doi: 10.1039/c004506c. Epub Jun. 10, 2010.
Chinese Office Action dated Nov. 10, 2021 for Application No. CN 201680059383.7.
Chinese Notice of Allowance dated Jan. 29, 2022 for Application No. CN 201680059383.7.
Mutafopulos et al., Selective cell encapsulation, lysis, pico-injection and size-controlled droplet generation using traveling surface acoustic waves in a microfluidic device. Lab Chip. Nov. 7, 2020;20(21):3914-3921. doi: 10.1039/d0lc00723d. Epub Sep. 23, 2020.
Ung et al., Enhanced surface acoustic wave cell sorting by 3D microfluidic-chip design. Lab Chip. Oct. 3, 2017;17(23): 4059-4069. doi: 10.1039/C7LC00715A.

\* cited by examiner

US 11,559,806 B2

ACOUSTIC WAVE SORTING

RELATED APPLICATIONS

This application is a national stage filing under 35 U.S.C. § 371 of International Patent Application Serial No. PCT/US2016/048513, filed Aug. 25, 2016, entitled "Acoustic Wave Sorting," which claims the benefit of U.S. Provisional Patent Application Ser. No. 62/210,899, filed Aug. 27, 2015, entitled "Acoustic Wave Sorting," by Weitz, et al., each incorporated herein by reference in its entirety.

GOVERNMENT FUNDING

This invention was made with government support under Grant No. HR0011-11-C-0093 awarded by DARPA (Department of Defense). The government has certain rights in the invention.

FIELD

The present invention generally relates to the manipulation of species using acoustic waves such as surface acoustic waves.

BACKGROUND

Surface acoustic waves (SAWs) provide a method for driving flows and directing particle motion, e.g., in microfluidic systems. The acoustic waves generated by a SAW transducer can efficiently actuate broad classes of species including particles, beads, cells, gels, and droplets in continuous flow. Devices based on acoustic waves can be used to manipulate cells and particles. These devices feature control of each particle's spatial position through dynamic patterning of the underlying acoustic standing wave. However, most SAW sorters only utilize the component of the acoustic wave that is oriented in the plane of the device, despite the fact that the acoustic wave's normal component is several fold greater in magnitude. There has yet to be a SAW device which takes advantage of the normal component of the acoustic wave for sorting purposes.

SUMMARY

The present invention generally relates to the manipulation of species using acoustic waves such as surface acoustic waves. The subject matter of the present invention involves, in some cases, interrelated products, alternative solutions to a particular problem, and/or a plurality of different uses of one or more systems and/or articles.

In one aspect, the present invention is generally directed to an apparatus. In one set of embodiments, the apparatus comprises a microfluidic channel having a groove defined in a first surface, the groove having a cross-sectional dimension sized to allow a mammalian cell to fit within the groove, and an acoustic wave generator positioned proximate a second surface of the microfluidic channel, the second surface adjacent to the first surface.

The apparatus, in accordance with another set of embodiments, includes a microfluidic channel having a groove defined in a first surface, the groove having a cross-sectional dimension having a cross-sectional dimension of at least about 30 micrometers, and an acoustic wave generator positioned proximate a second surface of the microfluidic channel, the second surface adjacent to the first surface.

In still another set of embodiments, the apparatus comprises a microfluidic channel having a first channel portion and a second channel portion, and a transducer positioned to apply acoustic waves to the microfluidic channel. In some cases, the second channel is positioned such that acoustic waves from the transducer can reach the second channel portion without passing through the first channel portion and the first channel portion without passing through the second channel portion. In certain instances, the second channel is positioned such that acoustic waves from the transducer do not directly pass through the second channel portion.

The apparatus, in yet another set of embodiments, comprises a microfluidic channel having a first portion having a first outlet and a second portion having a second outlet. In some cases, the first portion and the second portion are arranged orthogonally with respect to a direction of average fluid flow within the channel. The apparatus may also comprise a transducer positioned to apply acoustic waves to at least a portion of the microfluidic channel. In some embodiments, the transducer is positioned to apply acoustic waves in a direction substantially orthogonal to the direction of average fluid flow within the channel, and/or substantially orthogonal to the arrangement of the first portion and the second portion.

According to still another set of embodiments, the apparatus comprises a microfluidic channel having a first portion containing a plurality of species flowing therethrough and a second portion free of the species, and an acoustic wave generator positioned to apply acoustic waves to at least a portion of the microfluidic channel to cause at least some of the species to move from the first portion to the second portion of the microfluidic channel. In some cases, an imaginary plane separating the first portion and the second portion is not substantially orthogonal to the direction of acoustic wave propagation from the transducer.

In another aspect, the present invention is generally directed to a sorting method. In one set of embodiments, the method includes flowing a species contained in a fluid within a microfluidic channel having a first outlet and a second outlet, and applying acoustic waves to deflect the species to enter the second outlet, where in the absence of the acoustic waves, the species enters the first outlet. In some cases, the acoustic waves may be applied using an acoustic wave generator to deflect the species within the microfluidic channel in a direction having an axial component defined by propagation of the acoustic waves from the acoustic wave generator and a lateral component defined substantially orthogonally thereto. In some embodiments, the lateral component is greater than the axial component.

In another aspect, the present invention encompasses methods of making one or more of the embodiments described herein, for example, microfluidic devices for sorting cells, particles, or other species. In still another aspect, the present invention encompasses methods of using one or more of the embodiments described herein, for example, microfluidic devices for sorting cells, particles, or other species.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

The present invention generally relates to the manipulation of species using acoustic waves such as surface acoustic waves. In some aspects, a channel such as a microfluidic channel may be provided having two or more outlets, and acoustic waves applied to species within the channel to determine which outlet the species is directed to. For instance, surface acoustic waves may be applied to a species such as a cell or a particle to deflect it from the channel into a groove or other portion that directs it to a different outlet. In some cases, surprisingly, this deflection of species may be in a different direction than the incident acoustic waves on the channel. Other embodiments of the present invention are generally directed to kits including such systems, techniques for producing such systems, or the like.

Figure 6A:
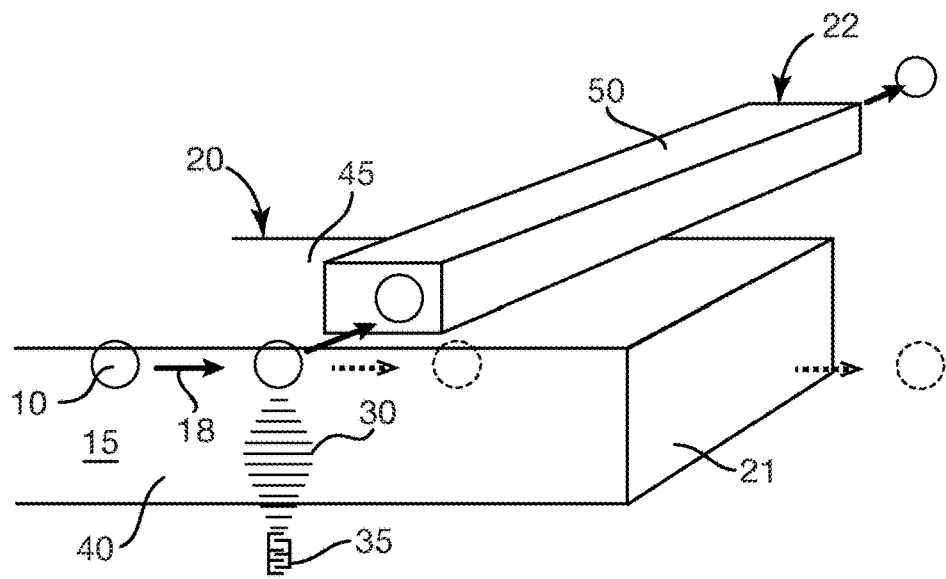
FIGS. 6A-6C illustrate operation of a device in yet another embodiment of the invention.

One aspect of the invention is now described with reference to FIG. 6A as an illustrative, non-limiting example. In this figure, a species 10, such as a cell or a particle, is to be sorted or otherwise manipulated. Species 10 is contained in a fluid 15 within a channel 20, such as a microfluidic channel. The fluid may be, for example, water or another aqueous fluid, such as saline. In one set of embodiments, the species is to be sorted to a first outlet 21 or a second outlet 22.

Normally, species 10 will flow through channel 20 from left to right, as indicated by arrow 18, until it exits the channel through outlet 21 (e.g., to enter another channel, a reactor, a collection chamber, etc.), as are indicated by dotted lines in this figure. However, in some cases, acoustic waves 30 may be applied by transducer 35, or other acoustic wave generator. The transducer may be, for example, an interdigitated transducer, such as a tapered interdigital transducer (see, e.g. FIG. 7). The transducer may be positioned to apply acoustic waves at a side or surface 40 of the channel, as is shown in FIG. 6A.

The acoustic waves can cause deflection of species 10 to facilitate sorting. For instance, the acoustic waves can be applied when a certain species 10 is detected or determined (for example, a fluorescence signal). Surprisingly, rather than being simply deflected directly repulsively away from transducer 35, species 10 may be deflected upwardly or at an angle away from transducer 35, relative to the position of transducer 35 and the propagation of acoustic waves from the transducer. The deflection can be thought of as having two components: an axial component defined by the propagation of the acoustic waves from the transducer, and a lateral component defined orthogonally from the axial component, e.g., upward as shown in FIG. 1. Without wishing to be bound by any theory, it is believed that under some conditions, refraction of acoustic waves 30 as the acoustic waves enter fluid 15 may cause the acoustic waves to change direction, such that the waves do not merely propagate directly away from the transducer, but instead propagates at an angle relative to its initial direction.

In some embodiments, this may be used to move species, e.g., that are contained in fluid 15 within channel 20. Thus, for example, this may be used to move the species into a second channel portion. In FIG. 6A, this channel portion is depicted as groove 50, and is positioned on a surface 45 adjacent to the surface to which the acoustic waves are applied. Only a single groove 50 is present in this example. Groove 50 is positioned at an angle towards outlet 22. However, in other embodiments, other configurations for the second channel are also possible, and the deflection need not necessarily be upward ("upward" is shown in FIG. 6A merely for ease of presentation). In this figure, species 10 can be moved into and contained within groove 50, and thereby directed to outlet 22 rather than outlet 21. Accordingly, upon application of a suitable acoustic wave, species 10 may be directed to groove 50 to outlet 22, rather than proceeding through to outlet 21. In this way, a plurality of species may be sorted.

The above discussion is a non-limiting example of one embodiment of the present invention that can be used to sort a species, such as a cell or a particle. However, other embodiments are also possible. Accordingly, more generally, various aspects of the invention are directed to various systems and methods for manipulation of species using acoustic waves such as surface acoustic waves.

For instance, in one aspect, the present invention is generally directed to the manipulation of species in a channel using acoustic waves such as surface acoustic waves. The species may be, for example, cells or particles, or other species as described herein, that can be manipulated in some fashion (e.g., moved, repelled, deflected, etc.) using acoustic waves. For example, the species may be moved from a first portion of a channel to a second portion of the channel under the influence of the acoustic waves.

Figure 6B:
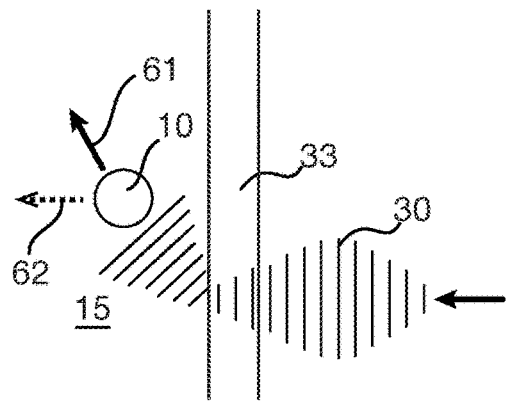

In one set of embodiments, acoustic waves are applied at a surface of a channel to manipulate a species contained in a fluid within the channel. Surprisingly, the acoustic waves may cause the species to move in a direction different from the direction of propagation of acoustic waves reaching the channel. Without wishing to be bound by any theory, it is believed that the acoustic waves may refract upon entering the fluid (i.e., through the channel wall, thereby propagating in a different direction). The angle at which the acoustic waves are diffracted may be governed by factors such as the speed of sound in the fluid and in the channel walls. For instance, as is shown in FIG. 6B, acoustic waves 30 entering fluid 15 through wall 33 may be refracted, which may cause the movement or deflection of species 10 in a lateral direction (indicated by arrow 61), rather than in an axial direction away from the direction of propagation (indicated by arrow 62).

Figure 6C:
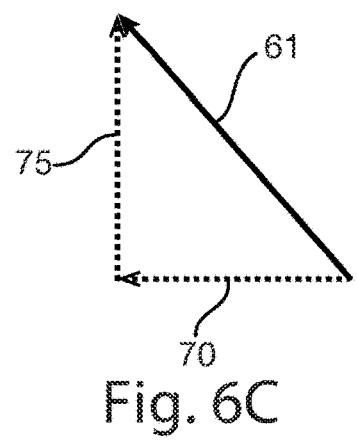

This deflection can be thought of as having two vector components: an axial component 70 as is shown in FIG. 6C (defined by the direction of propagation of acoustic waves), and a lateral component 75 defined orthogonally to the axial component. The ratio between the two of these vector components defines the angle of deflection. In some cases, the lateral component is equal to or greater than the axial component, and in some cases, the lateral component may be at least about 1.5, at least about 2, at least about 2.5, at least about 3, at least about 4, at least about 5 times, at least about 10 times, at least about 20 times, at least about 30 times, at least about 50 times, at least about 75 times, or at least about 100 times greater. In addition, in other embodiments, the lateral component may be less than the axial component. It should be noted that "upwardly" is used here merely for convenience and ease of presentation only; in reality, the channel and the channel walls may be positioned in any suitable orientation, not necessarily parallel to the ground. Also, in some cases, the deflection may be "down" instead of "up."

Figure 8A:
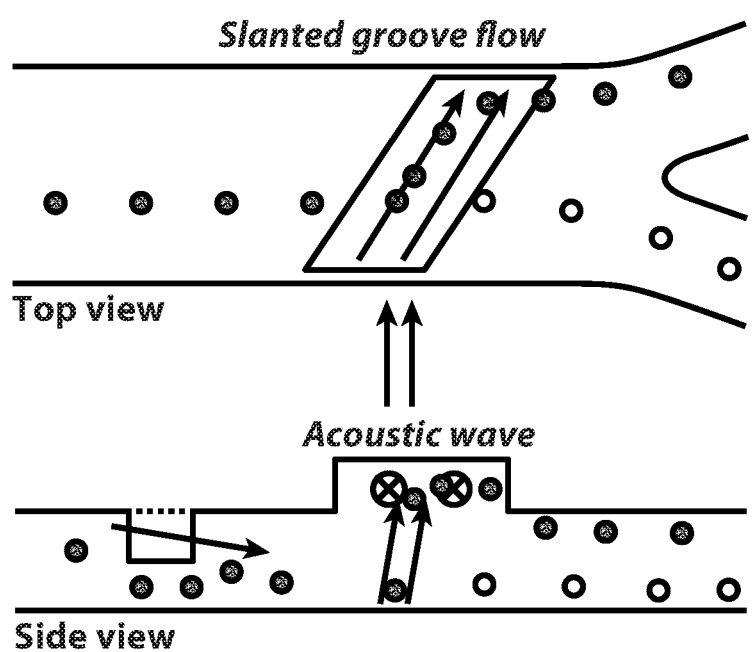
FIGS. 8A-8C illustrate various devices according to yet other embodiments of the invention.

In one set of embodiments, one or more species may be present in a first channel portion but not in a second channel portion. For example, an obstruction or other obstacle may be used to divert species to a first channel portion, such as is shown in FIG. 8A; as another non-limiting example, a species may simply be inserted into the fluid in the first channel portion but not the second channel portion. By applying suitable acoustic waves, the species in the first channel portion may be diverted to a second channel portion, for example, a groove as is shown in FIG. 8A. In some cases, the acoustic waves may be applied only at the first channel portion, or pass through both portions such that the acoustic waves reaching the second channel portion do not pass through the first channel portion. In some embodiments, the second channel portion may be positioned such that at least part of the second channel portion is positioned laterally with respect to the first channel portion, relative to the direction of acoustic wave propagation. Optionally, the first portion and the second portion may be separated by an imaginary plane, which may be positioned such that it is not substantially orthogonal to the direction of acoustic wave propagation.

The second channel portion may be present on or be defined by a surface of a channel. The second channel portion may be a groove, indentation, or other surface feature. The second channel portion can have straight sides, curved sides, or the like. The second channel portion may be shaped or sized to allow the species to enter in, and/or to move the species to an outlet, i.e., a second outlet. In such a manner, one or more species may be desirably directed to either a first outlet or a second outlet based on application of an acoustic wave.

In one set of embodiments, the second channel portion may have the shape of a groove. A non-limiting example is illustrated in FIG. 8A. The second channel portion may be sized to have a cross-sectional dimension that allows the species to enter within the second channel portion, e.g., to direct the species to an outlet. In addition, in some cases, the second channel portion may be slanted or positioned, e.g., at a nonzero angle with respect to the channel, to direct the species to the outlet. Any suitable angle can be used, e.g., about 0°, about 5°, about 10°, about 20°, about 30°, about 40°, about 50°, about 60°, about 70°, about 80°, about 90°, about 100°, about 110°, about 120°, about 130°, about 140°, about 150°, about 160°, about 170°, about 175°, about 180° etc. Thus, as an example, the second channel portion may contain at least one wall that is not parallel or perpendicular to the channel.

Figure 8B:
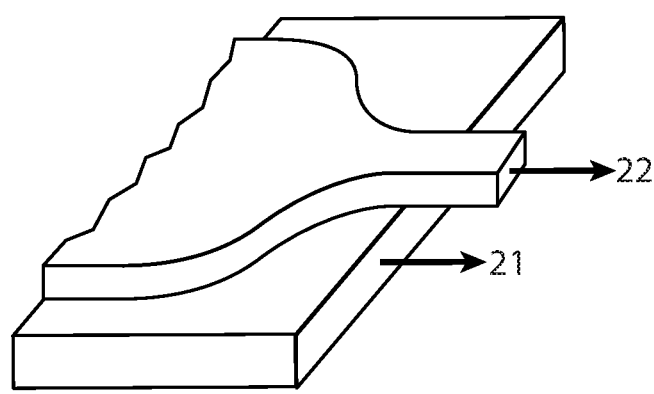
Figure 8C:
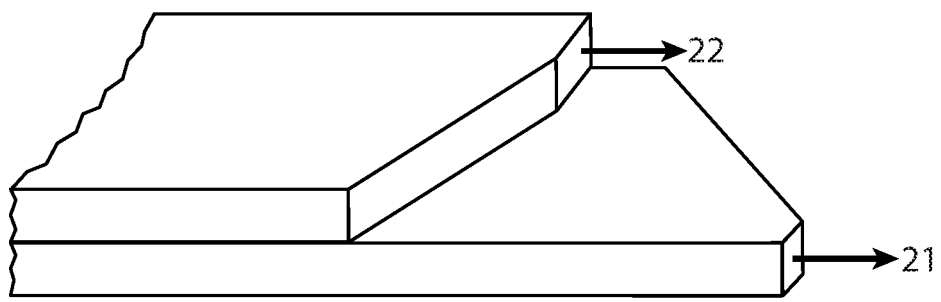

However, while a slanted groove is shown in FIG. 8A, it should be understood that this is by way of example only. In other embodiments, the second channel portion may have a variety of other shapes, such as those shown in FIGS. 8B and 8C. In addition, as mentioned, in some cases, three, four, or more outlets may be present. Sorting or manipulation of one or more species may be controlled by one, or more than one, acoustic wave generator. For instance, in some cases, a first acoustic wave may deflect a species to a second portion, while a second acoustic wave (from the same or different acoustic wave generators) may deflect a species to a third portion. By applying suitable acoustic waves (or not applying an acoustic wave), a species may be directed into any desired outlet.

As mentioned, the second channel portion may be sized to accept the entry of a species therein, at least in certain embodiments. The second channel portion can have, for example, a cross-sectional dimension (i.e., relative to average fluid flow within the second channel portion) of at least about 10 micrometers, at least about 15 micrometers, at least about 20 micrometers, at least about 25 micrometers, at least about 30 micrometers, at least about 40 micrometers, at least about 50 micrometers, at least about 75 micrometers, at least about 100 micrometers, at least about 150 micrometers, at least about 200 micrometers, at least about 250 micrometers, at least about 500 micrometers, etc. In some cases, the second channel portion has a maximum cross-sectional dimension that is less than the maximum cross-sectional dimension of the channel.

Thus, certain aspects of the present invention relate to the control or manipulation of species, for example, in microfluidic systems. For instance, according to one set of embodiments, species such as cells or particles may be sorted using acoustic waves. The species may be any suitable species that can be manipulated by an applied acoustic wave. Non-limiting examples include cells (for example, human cells, mammalian cells, bacterial cells, etc.), particles, droplets, gels, bubbles, quantum dots, beads (e.g., fluorescent beads), viruses, or the like. In some cases, the species may contain other entities therein (for example, nucleic acids such as siRNA, RNAi and DNA, proteins, peptides, or enzymes, chemicals, polymers, drugs, etc.).

In some cases, for example, a species may be sorted or otherwise manipulated at relatively high rates. For example, a characteristic of a species may be sensed and/or determined in some fashion (e.g., as further described herein), then the species may be directed towards a particular region of the device, such as a channel or an outlet, for example, for sorting purposes.

In certain embodiments, a channel can include at least a first outlet and a second outlet. In some cases, more than one inlet channel and/or more than one outlet channel may be present. By suitable application of surface acoustic waves, droplets contained within a fluid flowing through the channel may be directed into the first outlet or the second outlet. In other embodiments, however, other configurations of channels and junctions may be used, e.g., as described herein.

In some embodiments, species such as cells or particles may be sorted at relatively high rates. For instance, at least about 10 species per second may be sorted in some cases, and in other cases, at least about 20 species per second, at least about 30 species per second, at least about 100 species per second, at least about 200 species per second, at least about 300 species per second, at least about 500 species per second, at least about 750 species per second, at least about 1,000 species per second, at least about 1,500 species per second, at least about 2,000 species per second, at least about 3,000 species per second, at least about 5,000 species per second, at least about 7,500 species per second, at least about 10,000 species per second, at least about 15,000 species per second, at least about 20,000 species per second, at least about 30,000 species per second, at least about 50,000 species per second, at least about 75,000 species per second, at least about 100,000 species per second, at least about 150,000 species per second, at least about 200,000 species per second, at least about 300,000 species per second, at least about 500,000 species per second, at least about 750,000 species per second, at least about 1,000,000 species per second, at least about 1,500,000 species per second, at least about 2,000,000 or more species per second, or at least about 3,000,000 or more species per second may be sorted or otherwise manipulated. In some cases, as discussed, this control may be on a single species basis, e.g., through the use of suitable acoustic waves.

In one aspect, the present invention is generally directed to applying acoustic waves, such as surface acoustic waves, to a fluid containing species flowing in a channel, such as a microfluidic channel. The acoustic waves may be applied by a suitable acoustic wave generator. A surface acoustic wave ("SAW") is, generally speaking, an acoustic wave able to travel along the surface of a material exhibiting elasticity, with an amplitude that typically decays exponentially with depth into the material. By selecting suitable acoustic waves, pressure changes may be induced in the fluid, which can be used to manipulate the fluid in some cases. For example, acoustic waves applied to a fluid may increase or decrease the pressure on the fluid, which may cause the fluid to flow faster or slower due to the change in pressure, relative to fluid flow in the absence of the acoustic waves. As other examples, the acoustic waves may be used to deflect the fluid or to cause fluid to flow to a different location.

In some cases, the magnitude of the pressure change is related to the power or the amplitude of the applied acoustic waves. In certain embodiments, the acoustic waves may be applied at an amplitude and/or at a direction selected to alter a flow characteristic of the fluid, e.g., its flow rate or direction of flow. Thus, for example, acoustic waves may be used to sort species such as cells or particles, or other species discussed herein.

The acoustic waves may be applied at varying amplitudes or powers in some cases. In some cases, the pressure changes created in the fluid may be a function of the power of the acoustic wave. For example, the acoustic waves may have a power of at least about 0 dBm, at least about 3 dBm, at least about 6 dBm, at least about 9 dBm, at least about 12 dBm, at least about 15 dBm, at least about 20 dBM, etc. The acoustic waves may also have any suitable average frequency, in various embodiments. For example, the average frequency of the acoustic waves may be between about 100 MHz and about 200 MHz, between about 130 MHz and about 160 MHz, between about 140 MHz and about 150 MHz, between about 100 MHz and about 120 MHz, between about 120 MHz and about 140 MHz, between about 140 MHz and about 160 MHz, between about 160 MHz and about 180 MHz, or between about 180 MHz and about 200 MHz or the like, and/or combinations thereof. In other embodiments, the frequency may be between about 50 Hz and about 100 KHz, between about 100 Hz and about 2 kHz, between about 100 Hz and about 1,000 Hz, between about 1,000 Hz and about 10,000 Hz, between about 10,000 Hz and about 100,000 Hz, or the like, and/or combinations thereof. In some cases, the frequency may be at least about 10 Hz, at least about 30 Hz, at least about 50 Hz, at least about 100 Hz, at least about 300 Hz, at least about 1,000 Hz, at least about 3,000 Hz, at least about 10,000 Hz, at least about 30,000 Hz, at least about 100,000 Hz, at least about 300,000 Hz, at least about 1 MHz, at least about 3 MHz, at least about 10 MHz, at least about 30 MHz, at least about 100 MHz, at least about 300 MHz, or at least about 1 GHz or more in some embodiments. In certain instances, the frequency may be no more than about 1 GHz, no more than about 300 MHz, no more than about 100 MHz, no more than about 30 MHz, no more than about 10 MHz, no more than about 3 MHz, no more than about 1 MHz, no more than about 300,000 Hz, no more than about 100,000 Hz, no more than about 30,000 Hz, no more than about 10,000 Hz, no more than about 3,000 Hz, no more than about 1,000 Hz, no more than about 300 Hz, no more than about 100 Hz, or the like.

The acoustic waves may be applied, in some embodiments, in a downstream direction or an upstream direction, relative to the flow of fluid in a channel, which can be used to increase or decrease fluid flow within the channel. For example, acoustic waves may be applied to a channel, such as a microfluidic channel, in a direction of fluid flow within the channel, in a direction opposite of fluid flow within the channel, or in another direction (e.g., perpendicular to fluid flow within the channel). In other embodiments, the acoustic waves may be applied at any suitable angle relative to the channel, for example, about 0°, about 5°, about 10°, about 20°, about 30°, about 40°, about 50°, about 60°, about 70°, about 80°, about 90°, about 100°, about 110°, about 120°, about 130°, about 140°, about 150°, about 160°, about 170°, about 175°, about 180° etc.). It should be noted that in addition to this angle, there may be a change in angle caused by refraction, as discussed herein.

In some cases, more than one acoustic wave may be applied to control fluid flow within the channel, e.g., to sort species such as cells or particles. For example, a first acoustic wave generator may be used to increase the pressure within the channel and the second used to decrease the pressure within the channel (e.g., relative to the pressure when no acoustic waves are present), the first acoustic wave generator may be used to increase fluid flow and the second acoustic wave generator used to decrease fluid flow, etc. (e.g., relative to the fluid flow when no acoustic waves are present). The acoustic waves may be applied at the same, or different regions of a channel, depending on the application. For instance, in some cases, a first acoustic wave and a second acoustic wave may be applied to overlapping portions of a fluid, or a first acoustic wave may be applied to a first portion of a fluid within a channel, and the second acoustic wave may be applied to a second portion of the fluid within the channel. If more than one acoustic wave is applied to a fluid, the acoustic waves may be applied in any suitable order, e.g., simultaneously, sequentially, periodically, etc.

Without wishing to be bound by any theory, it should be noted that acoustic waves may be very rapidly controlled, e.g., electrically, and typically can be applied to fluids at very small time scales. Thus, individual regions of fluids (for example, within a channel) may be controlled to an arbitrary degree, e.g., without affecting other regions of fluids, even nearby or adjacent ones. Thus, for example, a single species may be sorted independent of other species within the fluid. In some cases, acoustic waves can be applied to a first region, then no acoustic waves may be applied, or acoustic waves of a different magnitude and/or frequency, applied to an adjacent or nearby second region. Thus, each region can be independently controlled, for instance, for sorting purposes, without affecting adjacent or nearby regions.

In one set of embodiments, the characteristic response time, i.e., the time it takes to see a change in a fluid region created by the presence of the acoustic wave, may be smaller than the time it takes that fluid region to fully pass a specific location within the channel, thereby allowing a high degree of control of the fluid region. Thus, a single species, such as a cell or particle, may be controlled without affecting other, nearby species. In contrast, many other systems or methods for controlling fluids within a channel, such as a microfluidic channel, typically rely on fluid characteristics or characteristics of the channel, which often have characteristic response times that are much longer, e.g., such that individual droplets or regions cannot be independently controlled.

In addition, in some cases, the acoustic waves may be applied continuously, or intermittently or "pulsed." In addition, in some cases, the acoustic waves may be constant (i.e., having a fixed magnitude), or the acoustic waves may have an amplitude whose magnitude varies in time, e.g., the acoustic waves may have an amplitude that varies independently of the frequency of the acoustic waves.

As discussed, the acoustic waves may be applied to any suitable channel. In one set of embodiments, the acoustic waves are applied to a fluid contained within a channel, such as a microfluidic channel, to sort a species. Various examples of microfluidic channels are discussed herein. More than one fluid may be present within the channel, in some instances, e.g., flowing as separate phases (for example, side-by-side, as droplets of a first fluid contained within a second fluid, etc.). Non-limiting examples of such channels include straight channels, bent channels, droplet-making channel configurations, and the like.

In addition, in some embodiments, the acoustic waves may be applied at similar modulation frequencies, i.e., at least about 10 Hz, at least about 20 Hz, at least about 30 Hz, at least about 100 Hz, at least about 200 Hz, at least about 300 Hz, at least about 500 Hz, at least about 750 Hz, at least about 1,000 Hz, at least about 1,500 Hz, at least about 2,000 Hz, at least about 3,000 Hz, at least about 5,000 Hz, at least about 7,500 Hz, at least about 10,000 Hz, at least about 15,000 Hz, at least about 20,000 Hz, at least about 30,000 Hz, at least about 50,000 Hz, at least about 75,000 Hz, at least about 100,000 Hz, at least about 150,000 Hz, at least about 200,000 Hz, at least about 300,000 Hz, at least about 500,000 Hz, at least about 750,000 Hz, at least about 1,000,000 Hz, at least about 1,500,000 Hz, at least about 2,000,000 Hz, or at least about 3,000,000 Hz.

In some cases, the acoustic waves may be surface acoustic waves. The surface acoustic waves may be created using a surface acoustic wave generator such as an interdigitated transducer, and/or a material such as a piezoelectric substrate. In one set of embodiments, the piezoelectric substrate may be isolated from the substrate except at or proximate the location where the acoustic waves are to be applied, e.g., proximate a first or second channel, proximate a junction of two or more channels, etc. At such locations, the substrate may be coupled to the piezoelectric substrate (or other material) by one or more coupling regions.

Any suitable technique may be used to create a surface acoustic wave. For example, the surface acoustic waves may be created by a generator attached to the surface of a material. In certain embodiments, the surface acoustic wave is created by using an interdigitated electrode or transducer able to convert electrical signals into acoustic waves able to travel along the surface of a material, and in some cases, the frequency of the surface acoustic waves may be controlled by controlling the spacing of the finger repeat distance of the interdigitated electrode or transducer. The surface acoustic waves can be formed on a piezoelectric substrate or other material that may be coupled to a microfluidic substrate at specific locations, e.g., at locations within the microfluidic substrate where sorting is to take place. Suitable voltages (e.g., sinusoidal or other periodically varying voltages) are applied to the piezoelectric substrate, which converts the electrical signals into mechanical vibrations, i.e., surface acoustic waves or sound. The sound is then coupled to the microfluidic substrate, e.g., from the surface of the material. In the microfluidic substrate, the vibrations pass into liquid within microfluidic channels in the microfluidic substrate (e.g., liquid containing cells or other species to be sorted), which give rise to internal streaming or scattering within the fluid. In some cases, the amount of scattering may be greater than streaming. Thus, by controlling the applied voltage, streaming and/or scattering within the microfluidic channel may be controlled, which may be used in some embodiments to direct or sort species within the microfluidic channel.

Figure 7:
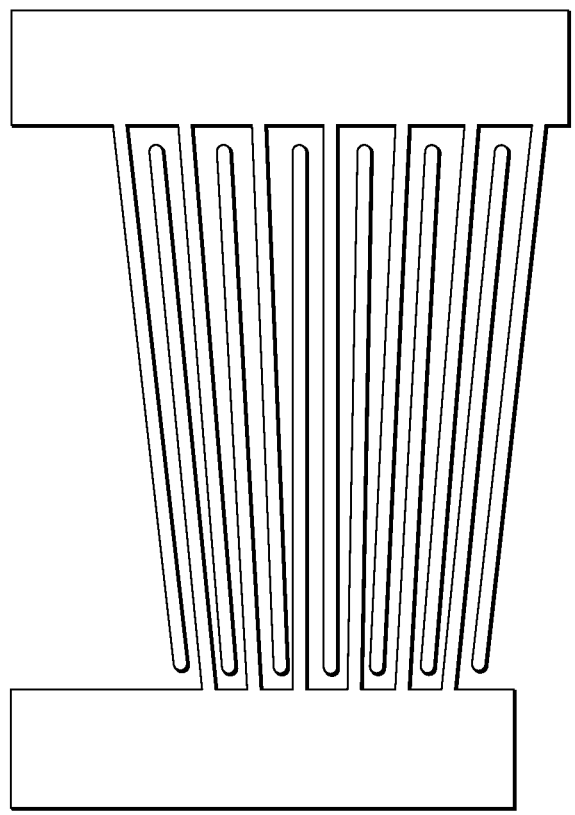
FIG. 7 illustrates a tapered interdigital transducer in accordance with another embodiment of the invention.

An interdigitated transducer typically comprises one, two, or more electrodes containing a plurality of "fingers" extending away from the electrode, wherein at least some of the fingers are interdigitated. The fingers may be of any length, and may independently have the same or different lengths. The fingers may be spaced on the transducer regularly or irregularly. In some cases, the fingers may be substantially parallel, although in other embodiments they need not be substantially parallel. For example, in one set of embodiments, the interdigitated transducer is a tapered interdigitated transducer. In some cases, the fingers in a tapered interdigitated transducer may be arranged such that the fingers are angled inwardly, e.g., as shown in FIG. 7. Examples of such transducers may be found, e.g., in International Patent Application No. PCT/US2011/048804, filed Aug. 23, 2011, entitled "Acoustic Waves in Microfluidics," by Weitz, et al., published as WO 2012/027366 on Mar. 1, 2012; and U.S. Provisional Patent Application Ser. No. 61/665,087, filed Jun. 27, 2012, entitled "Control of Entities Such as Droplets and Cells Using Acoustic Waves," by Weitz, et al., each incorporated herein by reference in their entireties.

The interdigitated electrode typically includes of two interlocking comb-shaped metallic electrodes that do not touch, but are interdigitated. The electrodes may be formed from any suitable electrode material, for example, metals such as gold, silver, copper, nickel, or the like. The operating frequency of the interdigitated electrode may be determined, in some embodiments, by the ratio of the sound velocity in the substrate to twice the finger spacing. For instance, in one set of embodiments, the finger repeat distance may be between about 10 micrometers and about 40 micrometers, between about 10 micrometers and about 30 micrometers, between about 20 micrometers and about 40 micrometers, between about 20 micrometers and about 30 micrometers, or between about 23 micrometers and about 28 micrometers.

The interdigitated electrode may be positioned on a piezoelectric substrate, or other material able to transmit surface acoustic waves, e.g., to a coupling region. The piezoelectric substrate may be formed out of any suitable piezoelectric material, for example, quartz, lithium niobate, lithium tantalate, lanthanum gallium silicate, etc. In one set of embodiments, the piezoelectric substrate is anisotropic, and in some embodiments, the piezoelectric substrate is a Y-cut $LiNbO_3$ material.

The piezoelectric substrate may be activated by any suitable electronic input signal or voltage to the piezoelectric substrate (or portion thereof). For example, the input signal may be one in which a periodically varying signal is used, e.g., to create corresponding acoustic waves. For instance, the signals may be sine waves, square waves, sawtooth waves, triangular waves, or the like. The frequency may be for example, between about 50 Hz and about 100 KHz, between about 100 Hz and about 2 kHz, between about 100 Hz and about 1,000 Hz, between about 1,000 Hz and about 10,000 Hz, between about 10,000 Hz and about 100,000 Hz, or the like, and/or combinations thereof. In some cases, the frequency may be at least about 50 Hz, at least about 100 Hz, at least about 300 Hz, at least about 1,000 Hz, at least about 3,000 Hz, at least about 10,000 Hz, at least about 30,000 Hz, at least about 100,000 Hz, at least about 300,000 Hz, at least about 1 MHz, at least about 3 MHz, at least about 10 MHz, at least about 30 MHz, at least about 100 MHz, at least about 300 MHz, or at least about 1 GHz or more in some embodiments. In certain instances, the frequency may be no more than about 1 GHz, no more than about 300 MHz, no more than about 100 MHz, no more than about 30 MHz, no more than about 10 MHz, no more than about 3 MHz, no more than about 1 MHz, no more than about 300,000 Hz, no more than about 100,000 Hz, no more than about 30,000 Hz, no more than about 10,000 Hz, no more than about 3,000 Hz, no more than about 1,000 Hz, no more than about 300 Hz, no more than about 100 Hz, or the like.

The interdigitated electrode may be positioned on the piezoelectric substrate (or other suitable material) such that acoustic waves produced by the interdigitated electrodes are directed at a region of acoustic coupling between the piezoelectric substrate and the microfluidic substrate. For example, the piezoelectric substrate and the microfluidic substrate may be coupled or physically bonded to each other, for example, using ozone plasma treatment, or other suitable techniques. In some cases, the rest of the piezoelectric substrate and the microfluidic substrate are at least acoustically isolated from each other, and in certain embodiments, the piezoelectric substrate and the microfluidic substrate are physically isolated from each other. Without wishing to be bound by any theory, it is believed that due to the isolation, acoustic waves created by the interdigitated electrode and the piezoelectric substrate do not affect the microfluidic substrate except at regions where it is desired that the acoustic waves are applied, e.g., at a channel or a junction.

The coupling region, if one is present, may have any suitable shape and/or size. The coupling region may be round, oval, or have other shapes, depending on the embodiment. In some cases, two, three, or more coupling regions may be used. In one set of embodiments, the coupling region is sized to be contained within a microfluidic channel. In other embodiments, however, the coupling region may be larger. The coupling region may be positioned within a channel or proximate to the channel, in some embodiments. See, e.g., Int. Pat. Apl. Ser. No. PCT/US2011/048804, filed Aug. 23, 2011, entitled "Acoustic Waves in Microfluidics," by Weitz, et al., published as WO 2012/027366 on Mar. 1, 2012, incorporated herein by reference.

In some cases, control of the species may be achieved by using a tapered interdigitated transducer. A tapered interdigitated transducer may allow relatively high control of the location at which a SAW is applied to a channel, in contrast to an interdigitated transducer where all of the fingers are parallel to each other and the spacing between electrodes is constant. Without wishing to be bound by any theory, it is believed that the location which a SAW can be applied by an interdigitated transducer is controlled, at least in part, by the spacing between the electrodes. By controlling the potential applied to the interdigitated transducer, and thereby controlling the resonance frequency of the applied SAW, the position and/or the strength of the SAW as applied by the interdigitated transducer may be correspondingly controlled. Thus, for example, applying a first voltage to an interdigitated transducer may cause a first resonance frequency of the resulting SAW to be applied (e.g., within a channel), while applying a second voltage may cause a second resonance frequency of the resulting SAW to be applied to a different location (e.g., within the channel). As another example, a plurality of coupling regions may be used, e.g., in combination with one or more tapered interdigitated transducers.

The microfluidic substrate may be any suitable substrate which contains or defines one or more microfluidic channels. For instance, as is discussed below, the microfluidic substrate may be formed out of polydimethylsiloxane, polytetrafluoroethylene, or other suitable elastomeric polymers, at least according to various non-limiting examples.

In some embodiments, a species may be determined or sensed in some fashion, and based on that determination, the species sorted or directed to a first location (e.g., a first outlet) or a second location (e.g., a second outlet), e.g., using acoustic waves The species may be determined, for example using one or more sensors that can sense and/or determine one or more characteristics of the species, and/or a characteristic of a portion of the fluidic system containing the species (e.g., the liquid surrounding the species) in such a manner as to allow the determination of one or more characteristics of the species. Characteristics determinable with respect to the species can be identified by those of ordinary skill in the art. Non-limiting examples of such characteristics include fluorescence, spectroscopy (e.g., optical, infrared, ultraviolet, etc.), radioactivity, mass, volume, density, temperature, viscosity, pH, concentration of a substance, such as a biological substance (for instance, a protein, a nucleic acid, etc.), or the like. In some cases, the sensor may be connected to a processor, which in turn, cause acoustic waves to be applied (or not applied).

One or more sensors and/or processors may be positioned to be in sensing communication with species suspected of being present within a channel. "Sensing communication," as used herein, means that the sensor may be positioned anywhere such that the species within the fluidic system (for example, within a channel), and/or a portion of the fluid containing the species may be sensed and/or determined in some fashion. For example, the sensor may be in sensing communication with the species and/or the portion of the fluid containing the species fluidly, optically or visually, thermally, pneumatically, electronically, or the like. The sensor can be positioned proximate a fluid containing the species, for example, embedded within or integrally connected to a wall of a channel, or positioned separately from the fluid but with physical, electrical, and/or optical communication with the fluid so as to be able to sense and/or determine the species and/or a portion of the fluid containing the species. For example, a sensor may be free of any physical connection with a channel containing a species, but may be positioned so as to detect electromagnetic radiation arising from the species or the fluid, such as infrared, ultraviolet, or visible light. The electromagnetic radiation may be produced by the species, and/or may arise from other portions of the fluid (or externally of the fluid) and interact with the species and/or the portion of the fluid containing the species in such as a manner as to indicate one or more characteristics of the species, for example, through absorption, reflection, diffraction, refraction, fluorescence, phosphorescence, changes in polarity, phase changes, changes with respect to time, etc. As an example, a laser may be directed towards the species and/or a fluid surrounding the species, and the fluorescence of the species and/or the surrounding fluid may be determined. "Sensing communication," as used herein may also be direct or indirect. As an example, light from a species may be directed to a sensor, or directed first through a fiber optic system, a waveguide, etc., before being directed to a sensor.

Non-limiting examples of sensors useful in the invention include optical or electromagnetically-based systems. For example, the sensor may be a fluorescence sensor (e.g., stimulated by a laser), a microscopy system (which may include a camera or other recording device), or the like. As another example, the sensor may be an electronic sensor, for instance, a sensor able to determine an electric field or other electrical characteristic. For example, the sensor may detect capacitance, inductance, etc., of a species and/or the portion of the fluidic system containing the species.

As used herein, a "processor" or a "microprocessor" is any component or device able to receive a signal from one or more sensors, store the signal, and/or direct one or more responses (e.g., as described above), for example, by using a mathematical formula or an electronic or computational circuit. The signal may be any suitable signal indicative of the environmental factor determined by the sensor, for example a pneumatic signal, an electronic signal, an optical signal, a mechanical signal, etc.

A variety of definitions are now provided which will aid in understanding various aspects of the invention. Following, and interspersed with these definitions, is further disclosure that will more fully describe the invention.

As used herein, the term "fluid" generally refers to a substance that tends to flow and to conform to the outline of its container, i.e., a liquid, a gas, a viscoelastic fluid, etc. Typically, fluids are materials that are unable to withstand a static shear stress, and when a shear stress is applied, the fluid experiences a continuing and permanent distortion. The fluid may have any suitable viscosity that permits flow. If two or more fluids are present, each fluid may be independently selected among essentially any fluids (liquids, gases, and the like) by those of ordinary skill in the art, by considering the relationship between the fluids. The fluids may each be miscible or immiscible. For example, two fluids can be selected to be essentially immiscible within the time frame of formation of a stream of fluids, or within the time frame of reaction or interaction. Where the portions remain liquid for a significant period of time, then the fluids should be essentially immiscible. Where, after contact and/or formation, the dispersed portions are quickly hardened by polymerization or the like, the fluids need not be as immiscible. Those of ordinary skill in the art can select suitable miscible or immiscible fluids, using contact angle measurements or the like, to carry out the techniques of the invention.

As used herein, a first entity is "surrounded" by a second entity if a closed planar loop can be drawn around the first entity through only the second entity. A first entity is "completely surrounded" if closed loops going through only the second entity can be drawn around the first entity regardless of direction (orientation of the loop). In one embodiment, the first entity is a cell, for example, a cell suspended in media is surrounded by the media. In another embodiment, the first entity is a particle. In yet another embodiment, the first entity is a fluid. The second entity may also be a fluid in some cases (e.g., as in a suspension, an emulsion, etc.), for example, a hydrophilic liquid may be suspended in a hydrophobic liquid, a hydrophobic liquid may be suspended in a hydrophilic liquid, a gas bubble may be suspended in a liquid, etc. Typically, a hydrophobic liquid and a hydrophilic liquid are essentially immiscible with respect to each other, where the hydrophilic liquid has a greater affinity to water than does the hydrophobic liquid. Examples of hydrophilic liquids include, but are not limited to, water and other aqueous solutions comprising water, such as cell or biological media, salt solutions, etc., as well as other hydrophilic liquids such as ethanol. Examples of hydrophobic liquids include, but are not limited to, oils such as hydrocarbons, silicone oils, mineral oils, fluorocarbon oils, organic solvents etc. Other examples of suitable fluids have been previously described.

Similarly, a "droplet," as used herein, is an isolated portion of a first fluid that is completely surrounded by a second fluid. It is to be noted that a droplet is not necessarily spherical, but may assume other shapes as well, for example, depending on the external environment. In one embodiment, the droplet has a minimum cross-sectional dimension that is substantially equal to the largest dimension of the channel perpendicular to fluid flow in which the droplet is located.

As mentioned, in some, but not all embodiments, the systems and methods described herein may include one or more microfluidic components, for example, one or more microfluidic channels. "Microfluidic," as used herein, refers to a device, apparatus or system including at least one fluid channel having a cross-sectional dimension of less than 1 mm, and a ratio of length to largest cross-sectional dimension of at least 3:1. A "microfluidic channel," as used herein, is a channel meeting these criteria. The "cross-sectional dimension" of the channel is measured perpendicular to the direction of fluid flow within the channel. Thus, some or all of the fluid channels in microfluidic embodiments of the invention may have maximum cross-sectional dimensions less than 2 mm, and in certain cases, less than 1 mm. In one set of embodiments, all fluid channels containing embodiments of the invention are microfluidic or have a largest cross sectional dimension of no more than 2 mm or 1 mm. In certain embodiments, the fluid channels may be formed in part by a single component (e.g. an etched substrate or molded unit). Of course, larger channels, tubes, chambers, reservoirs, etc. can be used to store fluids and/or deliver fluids to various components or systems of the invention. In one set of embodiments, the maximum cross-sectional dimension of the channel(s) containing embodiments of the invention is less than 500 microns, less than 200 microns, less than 100 microns, less than 50 microns, or less than 25 microns.

A "channel," as used herein, means a feature on or in an article (substrate) that at least partially directs flow of a fluid. The channel can have any cross-sectional shape (circular, oval, triangular, irregular, square or rectangular, or the like) and can be covered or uncovered. In embodiments where it is completely covered, at least one portion of the channel can have a cross-section that is completely enclosed, or the entire channel may be completely enclosed along its entire length with the exception of its inlet(s) and/or outlet(s). A channel may also have an aspect ratio (length to average cross sectional dimension) of at least 2:1, more typically at least 3:1, 5:1, 10:1, 15:1, 20:1, or more. An open channel generally will include characteristics that facilitate control over fluid transport, e.g., structural characteristics (an elongated indentation) and/or physical or chemical characteristics (hydrophobicity vs. hydrophilicity) or other characteristics that can exert a force (e.g., a containing force) on a fluid. The fluid within the channel may partially or completely fill the channel. In some cases where an open channel is used, the fluid may be held within the channel, for example, using surface tension (i.e., a concave or convex meniscus).

The channel may be of any size, for example, having a largest dimension perpendicular to fluid flow of less than about 5 mm or 2 mm, or less than about 1 mm, or less than about 500 microns, less than about 200 microns, less than about 100 microns, less than about 60 microns, less than about 50 microns, less than about 40 microns, less than about 30 microns, less than about 25 microns, less than about 10 microns, less than about 3 microns, less than about 1 micron, less than about 300 nm, less than about 100 nm, less than about 30 nm, or less than about 10 nm. In some cases the dimensions of the channel may be chosen such that fluid is able to freely flow through the article or substrate. The dimensions of the channel may also be chosen, for example, to allow a certain volumetric or linear flowrate of fluid in the channel. Of course, the number of channels and the shape of the channels can be varied by any method known to those of ordinary skill in the art. In some cases, more than one channel or capillary may be used. For example, two or more channels may be used, where they are positioned inside each other, positioned adjacent to each other, positioned to intersect with each other, etc.

In one set of embodiments, the species are cells or other entities, such as proteins, viruses, macromolecules, particles, etc. As used herein, a "cell" is given its ordinary meaning as used in biology. The cell may be any cell or cell type. For example, the cell may be a bacterium or other single-cell organism, a plant cell, or an animal cell. If the cell is a single-cell organism, then the cell may be, for example, a protozoan, a trypanosome, an amoeba, a yeast cell, algae, etc. If the cell is an animal cell, the cell may be, for example, an invertebrate cell (e.g., a cell from a fruit fly), a fish cell (e.g., a zebrafish cell), an amphibian cell (e.g., a frog cell), a reptile cell, a bird cell, or a mammalian cell such as a primate cell, a bovine cell, a horse cell, a porcine cell, a goat cell, a dog cell, a cat cell, or a cell from a rodent such as a rat or a mouse. If the cell is from a multicellular organism, the cell may be from any part of the organism. For instance, if the cell is from an animal, the cell may be a cardiac cell, a fibroblast, a keratinocyte, a heptaocyte, a chondracyte, a neural cell, a osteocyte, a muscle cell, a blood cell, an endothelial cell, an immune cell (e.g., a T-cell, a B-cell, a macrophage, a neutrophil, a basophil, a mast cell, an eosinophil), a stem cell, etc. In some cases, the cell may be a genetically engineered cell. In certain embodiments, the cell may be a Chinese hamster ovarian ("CHO") cell or a 3T3 cell.

A variety of materials and methods, according to certain aspects of the invention, can be used to form any of the above-described components of the systems and devices of the invention. In some cases, the various materials selected lend themselves to various methods. For example, various components of the invention can be formed from solid materials, in which the channels can be formed via micromachining, film deposition processes such as spin coating and chemical vapor deposition, laser fabrication, photolithographic techniques, etching methods including wet chemical or plasma processes, and the like. See, for example, Scientific American, 248:44-55, 1983 (Angell, et al). In one embodiment, at least a portion of the fluidic system is formed of silicon by etching features in a silicon chip. Technologies for precise and efficient fabrication of various fluidic systems and devices of the invention from silicon are known. In another embodiment, various components of the systems and devices of the invention can be formed of a polymer, for example, an elastomeric polymer such as polydimethylsiloxane ("PDMS"), polytetrafluoroethylene ("PTFE" or Teflon®), or the like.

Different components can be fabricated of different materials. For example, a base portion including a bottom wall and side walls can be fabricated from an opaque material such as silicon or PDMS, and a top portion can be fabricated from a transparent or at least partially transparent material, such as glass or a transparent polymer, for observation and/or control of the fluidic process. Components can be coated so as to expose a desired chemical functionality to fluids that contact interior channel walls, where the base supporting material does not have a precise, desired functionality. For example, components can be fabricated as illustrated, with interior channel walls coated with another material. Material used to fabricate various components of the systems and devices of the invention, e.g., materials used to coat interior walls of fluid channels, may desirably be selected from among those materials that will not adversely affect or be affected by fluid flowing through the fluidic system, e.g., material(s) that is chemically inert in the presence of fluids to be used within the device.

In one embodiment, various components of the invention are fabricated from polymeric and/or flexible and/or elastomeric materials, and can be conveniently formed of a hardenable fluid, facilitating fabrication via molding (e.g. replica molding, injection molding, cast molding, etc.). The hardenable fluid can be essentially any fluid that can be induced to solidify, or that spontaneously solidifies, into a solid capable of containing and/or transporting fluids contemplated for use in and with the fluidic network. In one embodiment, the hardenable fluid comprises a polymeric liquid or a liquid polymeric precursor (i.e. a "prepolymer"). Suitable polymeric liquids can include, for example, thermoplastic polymers, thermoset polymers, or mixture of such polymers heated above their melting point. As another example, a suitable polymeric liquid may include a solution of one or more polymers in a suitable solvent, which solution forms a solid polymeric material upon removal of the solvent, for example, by evaporation. Such polymeric materials, which can be solidified from, for example, a melt state or by solvent evaporation, are well known to those of ordinary skill in the art. A variety of polymeric materials, many of which are elastomeric, are suitable, and are also suitable for forming molds or mold masters, for embodiments where one or both of the mold masters is composed of an elastomeric material. A non-limiting list of examples of such polymers includes polymers of the general classes of silicone polymers, epoxy polymers, and acrylate polymers. Epoxy polymers are characterized by the presence of a three-membered cyclic ether group commonly referred to as an epoxy group, 1,2-epoxide, or oxirane. For example, diglycidyl ethers of bisphenol A can be used, in addition to compounds based on aromatic amine, triazine, and cycloaliphatic backbones. Another example includes the well-known Novolac polymers. Non-limiting examples of silicone elastomers suitable for use according to the invention include those formed from precursors including the chlorosilanes such as methylchlorosilanes, ethylchlorosilanes, phenylchlorosilanes, etc.

Silicone polymers are preferred in one set of embodiments, for example, the silicone elastomer polydimethylsiloxane. Non-limiting examples of PDMS polymers include those sold under the trademark Sylgard by Dow Chemical Co., Midland, Mich., and particularly Sylgard 182, Sylgard 184, and Sylgard 186. Silicone polymers including PDMS have several beneficial properties simplifying fabrication of the microfluidic structures of the invention. For instance, such materials are inexpensive, readily available, and can be solidified from a prepolymeric liquid via curing with heat. For example, PDMSs are typically curable by exposure of the prepolymeric liquid to temperatures of about, for example, about 65° C. to about 75° C. for exposure times of, for example, about an hour. Also, silicone polymers, such as PDMS, can be elastomeric and thus may be useful for forming very small features with relatively high aspect ratios, necessary in certain embodiments of the invention. Flexible (e.g., elastomeric) molds or masters can be advantageous in this regard.

One advantage of forming structures such as microfluidic structures of the invention from silicone polymers, such as PDMS, is the ability of such polymers to be oxidized, for example by exposure to an oxygen-containing plasma such as an air plasma, so that the oxidized structures contain, at their surface, chemical groups capable of cross-linking to other oxidized silicone polymer surfaces or to the oxidized surfaces of a variety of other polymeric and non-polymeric materials. Thus, components can be fabricated and then oxidized and essentially irreversibly sealed to other silicone polymer surfaces, or to the surfaces of other substrates reactive with the oxidized silicone polymer surfaces, without the need for separate adhesives or other sealing means. In most cases, sealing can be completed simply by contacting an oxidized silicone surface to another surface without the need to apply auxiliary pressure to form the seal. That is, the pre-oxidized silicone surface acts as a contact adhesive against suitable mating surfaces. Specifically, in addition to being irreversibly sealable to itself, oxidized silicone such as oxidized PDMS can also be sealed irreversibly to a range of oxidized materials other than itself including, for example, glass, lithium niobate, silicon, silicon oxide, quartz, silicon nitride, polyethylene, polystyrene, glassy carbon, and epoxy polymers, which have been oxidized in a similar fashion to the PDMS surface (for example, via exposure to an oxygen-containing plasma). Oxidation and sealing methods useful in the context of the present invention, as well as overall molding techniques, are described in the art.

Another advantage to forming microfluidic structures of the invention (or interior, fluid-contacting surfaces) from oxidized silicone polymers is that these surfaces can be much more hydrophilic than the surfaces of typical elastomeric polymers (where a hydrophilic interior surface is desired). Such hydrophilic channel surfaces can thus be more easily filled and wetted with aqueous solutions than can structures comprised of typical, unoxidized elastomeric polymers or other hydrophobic materials.

In one embodiment, a bottom wall is formed of a material different from one or more side walls or a top wall, or other components. For example, the interior surface of a bottom wall can comprise the surface of a silicon wafer or microchip, or other substrate. Other components can, as described above, be sealed to such alternative substrates. Where it is desired to seal a component comprising a silicone polymer (e.g. PDMS) to a substrate (bottom wall) of different material, the substrate may be selected from the group of materials to which oxidized silicone polymer is able to irreversibly seal (e.g., glass, silicon, silicon oxide, quartz, silicon nitride, polyethylene, polystyrene, epoxy polymers, and glassy carbon surfaces which have been oxidized). Alternatively, other sealing techniques can be used, as would be apparent to those of ordinary skill in the art, including, but not limited to, the use of separate adhesives, thermal bonding, solvent bonding, ultrasonic welding, etc.

The following documents are incorporated herein by reference in their entireties: U.S. Pat. Apl. Pub. Nos. 2013/0213488 and 2015/0192546; Int. Pat. Apl. Pub. Nos. WO 2012/027366, WO 2014/004630, and WO 2014/066624; and U.S. Pat Apl. Ser. No. 62/017,301. In addition, the following documents are incorporated herein by reference in their entireties: U.S. Pat. Nos. 5,512,131, 6,355,198, 8,765,485, and 9,038,919; U.S. Pat. Apl. Pub. Nos. 2005/0172476, 2007/0003442, and 2010/0248064; Int. Pat. Apl. Pub. Nos. WO 96/29629, WO 01/89787, WO 2004/002627, WO 2004/091763, and WO 2005/021151. In addition, U.S. Provisional Patent Application Ser. No. 62/210,899, filed Aug. 27, 2015, entitled "Acoustic Wave Sorting," by Weitz, et al., is incorporated herein by reference in its entirety.

The following examples are intended to illustrate certain embodiments of the present invention, but do not exemplify the full scope of the invention.

Example 1

By utilizing a vertical flow-focusing junction and a slanted ceiling groove, this example illustrates enhancement of surface acoustic wave cell sorting. These devices may be able to attain levels of performance approaching that of state of the art fluorescence-activated cell sorters in terms of event rate and purity. This example demonstrates a microfluidic cell sorter, which screens cells at rates approaching those of commercially-available FACS. This device incorporates a three-dimensional flow-focusing nozzle with a slanted ceiling groove to enhance the capabilities of a SAW transducer by harnessing the component of the SAW oriented normal to the plane of the substrate. This example determines the conditions for device performance, and uses these principles to implement a cell sorter. The device achieves sorting at a rate of 9000 events/s with 55% purity and yields 90% purity, while operating at 1000 events/s.

Without wishing to be bound by any theory, it is believed that when a SAW impinges on the flow of liquid within a microfluidic device, it refracts, forming a longitudinal acoustic wave in the liquid. It is this acoustic wave that can deflect cells. The angle of refraction for SAW is known as the Rayleigh angle, $\theta_R$, and it depends on the speed of sound in the liquid, $v_l$, and the speed of the SAW, $v_s$, according to Snell's law, $\sin \theta_R = v_l/v_s$. In the materials used for SAW microfluidics, the SAW travels along the substrate surface faster than the acoustic wave propagates in the liquid, so the Rayleigh angle is small and the refracted wave is directed closer to the substrate's surface normal than to the plane of the substrate. As a result, the normal component of the refracted acoustic wave is larger than the parallel component in general. The substrate plane is also constrains the design of the flow channel, because microfluidic channels made by lithographic techniques are defined by masks that are usually two dimensional. Moreover, microfluidic devices are assembled such that the lithographic plane is parallel to the substrate plane. Therefore, most microfluidic devices utilize the component of the acoustic wave parallel to the substrate for particle manipulations.

To exploit the component of the acoustic wave normal to the substrate, this example uses multi-layer microfluidic devices. A multi-layer SAW device, which exploits the normal component of SAW for sorting, can obtain enhanced sorting performance compared to existing designs, because it channels more of the available power into actuating cells.

This example implements a multi-layer device geometry that utilizes the normal component of the acoustic wave for cell sorting applications, illustrated in FIG. 1. Here, a tapered interdigital transducer (IDT) can generate surface acoustic waves that can actuate particles, cells, or other species. (Cells are used here and in the following examples by way of example only, and are intended to be illustrative and not limiting.) In the tapered IDT design, a range of frequencies can excite SAWs, at different positions along the transducer, because the resonant wavelength, defined by the pitch of the electrodes, varies along the transducer. The slope at which the IDT tapers determines the aperture of the SAW, by limiting the area of the transducer in which a given frequency resonates. The IDT is positioned directly adjacent to the microfluidic device's sorting channel to increase the amount of power that gets transferred to the liquid, by minimizing the distance the SAW must travel before it refracts into the liquid in the channel, as shown in FIG. 1A. The fingers of the IDT are situated beneath an air gap, to prevent the power carried by the SAW from leaking into the device prematurely. The flow channel of the microfluidic device contains micro-fabricated features, which enable the device to utilize the normal component of the acoustic wave, a slanted ceiling groove and a vertical flow-focusing nozzle. Their positions with respect to the IDT and the sorting channel as well as the air gap are shown in FIG. 1B.

The slanted groove generates a flow with a velocity profile that varies strongly with height; within the ceiling groove, fluid flows along the length of the groove, while the flow at the bottom of the sorting channel remains largely unperturbed. Consequently, it is the slanted groove, which harnesses the normal component of the acoustic wave, because the acoustic wave pushes cells to the top of the channel, where they interact with the flow within the groove. Thus, the groove ensures that the height at which a cell passes through the sorting channel determines whether it is discarded or retained. The slanted groove is presented in more detail in FIG. 1C. The slanted groove must be paired with a vertical flow-focusing nozzle, to ensure that only target cells interact with the groove. The cell inlet channel of the vertical flow focusing nozzle is fabricated at a lower height than the channels carrying sheath fluid. When the sheath channels intersect the cell inlet, at the entrance to the sorting channel, the sheath fluid focuses the cell flow laterally and vertically into a narrow thread at the bottom of the sorting channel. The sheath channels form a Y-shape with the sorting channel, which eliminates stagnation points just after the nozzle. The nozzle is offset from the midline of the channel, so that variations in flow rate or other unexpected perturbations will not cause cells to enter the retention channel spuriously. The nozzle geometry is depicted in FIG. 1D.

In the absence of surface acoustic waves, a cell passing through the device does not interact with the ceiling groove; it transits directly through the sorting channel and out of the device via the waste outlet unperturbed. When a cell of interest is detected, a pulse of SAW is applied, and the normal component of the resulting acoustic wave pushes the particle to the top of the sorting channel, where advection carries it across the sorting channel; this cell then exits the device through the retention outlet, where it can be recovered. In contrast with previous slanted groove microfluidic devices, which use arrays of slanted grooves to direct flows or particles, here, the interaction of cell with the groove depends on the application of the SAW pulse; the cell is deflected completely into the groove, and a single groove is sufficient to achieve the desired effect (although more than one groove could also be used). The angle of the slanted groove creates a flow, which ensures that cells continuously flow out of the device as they are sorted, unlike trapping designs, in which the desired particles are pinned behind a vertical barrier. As a result, this offers a device geometry uniquely adapted for rapid sorting of cells.

Figure 1A:
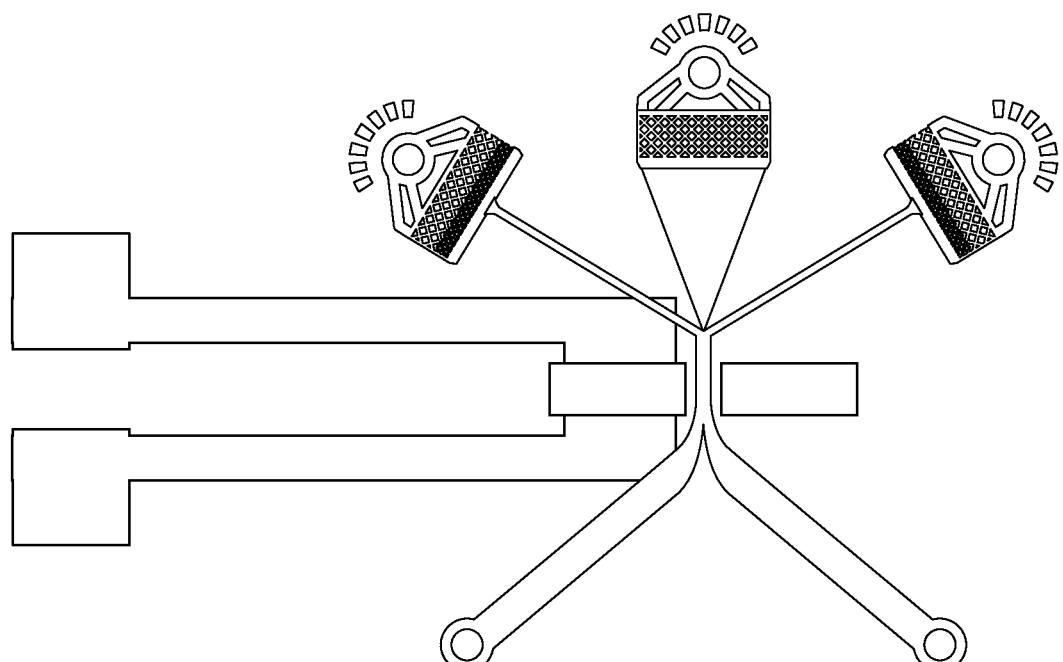
FIGS. 1A-1D schematically illustrate a device for sorting species, in accordance with one embodiment of the invention.
Figure 1B:
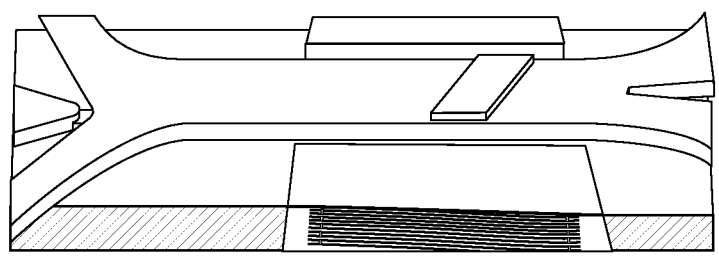
Figure 1C:
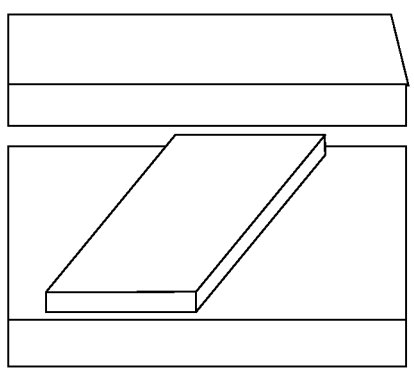
Figure 1D:
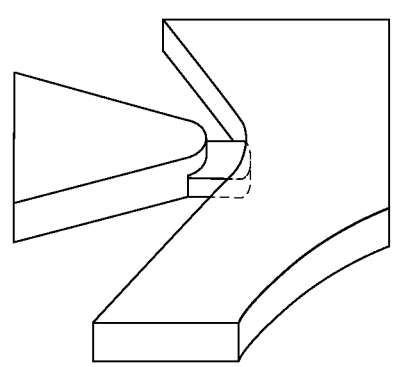

FIG. 1 shows a schematic of the groove-enhanced cell sorting design used in this particular example, Here, the relative positions of the flow channels and interdigital transducer (left/center bars) are illustrated (FIG. 1A). Metal pads (far left) connect to the fingers of the IDT through bus bars. The flow channel has a cell inlet (upper middle) and two sheath inlets (upper left and upper right) as well as a waste outlet (lower right) and a retention outlet (lower right). A zoomed in view shows the positions of the flow-focusing nozzle (left), the sorting channel (center), and the slanted groove (above the sorting channel), and the tapered IDT fingers (bottom). The flow-focusing nozzle is located where the two sheath flows and the cell inlet meet. The channel bifurcates after the slanted groove. The upper channel leads to the retention outlet, while the lower outlet leads to the waste outlet (FIG. 1B). Further details of the slanted groove and the nozzle design are provided in FIGS. 1C and 1D respectively.

Example 2

In this example, the capabilities of the slanted groove device were tested for cell sorting applications, by determining the conditions for which an applied SAW pulse generally succeeds at redirecting a target cell into the retention outlet. As a basis for testing, a device made from poly(dimethylsiloxane) (PDMS) was used, with a vertical flow-focusing nozzle that is 50 micrometers wide and 25 micrometers tall; a sorting channel that is 250 micrometers wide and 50 micrometers tall; and a rectangular groove which is 120 micrometers wide, rises 25 micrometers above the sorting channel (e.g., which can contain a cell), and is tilted 60° from the overall direction of flow. These dimensions are not intended to be limiting. The instrument triggers a SAW pulse whenever it detects a cell of interest, e.g., due to fluorescence, and the trajectories of individual cells are captured using a high-speed camera. Each resulting movie was analyzed to extract the trajectory of the target cell; a given sorting event was deemed a success if the desired cell exited the sorting channel through the retention outlet, or a failure if the desired cell exited the sorting channel through the waste outlet.

Cell tracks showing a non-fluorescent cell proceeding through the sorting channel to the waste outlet and a target cell being successfully pushed into the groove and subsequently traveling along the length of the groove to the retention outlet are shown in FIG. 2. For each of the parameters tested, the threshold value for which the device performance becomes consistent is defined as the lowest value for which at least 90% of the measured events are successful. The threshold value for each sorting condition is determined on three independent days of experiment using at least 48 individual events. These experiments assess the robustness and reproducibility of the technique under different conditions.

Figure 2A:
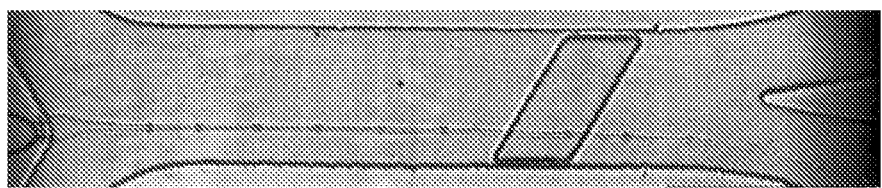
FIGS. 2A-2B illustrate a device for sorting cells, in another embodiment of the invention.
Figure 2B:
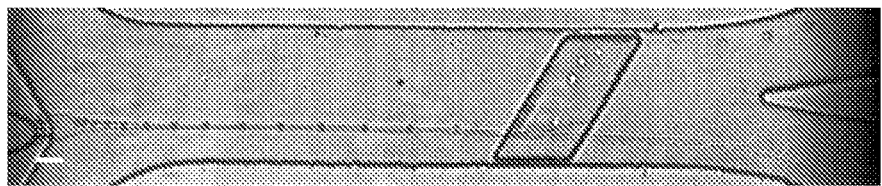

FIG. 2 illustrates that the slanted groove enhances surface acoustic wave (SAW) actuation. Two single cell tracks are captured from a device with a slanted groove that rises 25 micrometers above the sorting channel. In one case, no sorting pulse is applied (FIG. 2A), while in the other a pulse is applied (FIG. 2B). If no SAW is applied, the cell follows the same trajectory as the bulk of the cell phase fluid. The cell passes through the sorting channel and underneath slanted groove without deflection and exits the device through the waste channel (lower right). When the SAW pulse is applied, the cell is deflected into the slanted groove, where it is carried across the sorting channel by the flow of sheath fluid within the groove. The sorted cells moves laterally more than 150 micrometers and exits the device through the retention outlet (upper right). The cell phase fluid is visible, because of the index of refraction difference between the phosphate-buffered saline sheath phase and the cell phase that contains Optiprep. The cell tracks depicted here are projections of approximately 20 frames taken with a high speed camera at 11,267 fps. The scale bar represents 50 micrometers.

Example 3

Figure 3A:
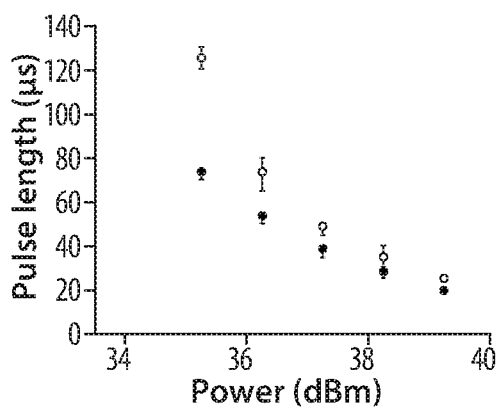
FIGS. 3A-3D illustrate characteristics of a sorting device, in yet another embodiment of the invention.

This example determines the minimum length of the SAW pulse required for the slanted groove device to reproducibly actuate cells into the sorting channel for a range of different RF power levels and cell types. As the radio frequency (RF) power used to generate the SAW is increased, shorter pulses provide enough energy to redirect cells into the groove. Cells can be efficiently actuated with pulses as short as 20 microseconds. For model adherent and non-adherent cell types, cells are reproducibly deflected into the groove with similar SAW pulse parameters, as shown in FIG. 3A. However, one cell line consistently requires less energy for deflection than the other, which suggests that the two cell lines may have inherent differences in their average size or acoustic contrast. Nevertheless, the slanted groove device can actuate both adherent and non-adherent cells and the range of parameters, for which actuation is efficient, is compatible with high-speed sorting applications.

In this example, the total flow rate was varied to determine the effect of average flow speed on the sorting process. For each flow rate, the length of the SAW pulse was constant at 50 microseconds and the ratio of cell phase to sheath flow was also held constant. The applied power was varied and the minimum power for which cells were successfully actuated consistently was recorded.

Figure 3B:
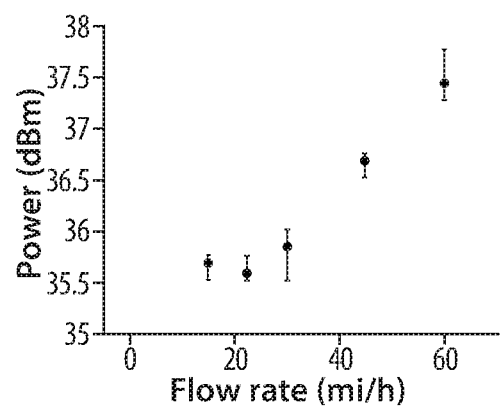

At low flow rates, the threshold power and flow rate were essentially uncorrelated, but at higher flow rates, there was a correlation between flow rate and applied power, as the cell's deflection became limited by the duration of exposure to the acoustic wave pulse. The relationship between the threshold power of the SAW pulse and the overall device flow rate is depicted in FIG. 3B. These results show that the sorting effect is robust at a broad range cell velocities.

Figure 3C:
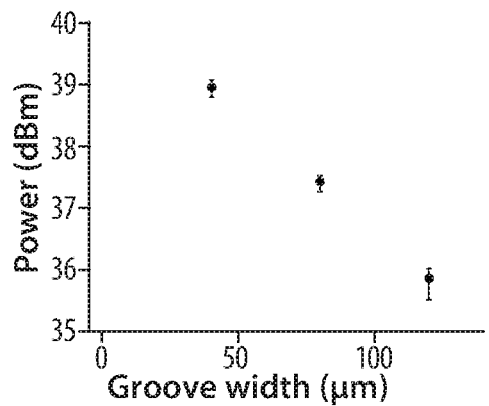
Figure 3D:
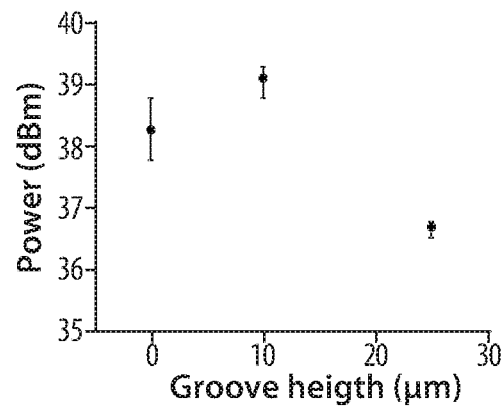

The impact of groove geometry on cell actuation in this design was quantified by varying the groove's width, height, and angle independently. Only one dimension of the groove was changed in each set of experiments and the threshold power required for sorting was measured, while the flow rate and the length of the sorting pulse as well as the other groove dimensions were all kept fixed. As the groove is widened, less power was necessary to cause the cell to interact with the flow within the groove, as demonstrated in FIG. 3C. While it is possible to sort cells using the vertical flow-focusing nozzle without any groove or with a very shallow groove, good sorting results were attained with grooves fabricated at a height of 25 micrometers, shown in FIG. 3D. Different groove angles showed no significant effect on the threshold power required for sorting. There may be a slight variation due to changes in the effective aperture of the groove or because the flow speed is higher in the groove with the lower angle, but these were within the range of measurement error, and had very little effect on the threshold power required for sorting.

These results demonstrate that both the depth and the width of the groove, but not the groove angle, provide geometrical tuning parameters, which can influence the interaction of cells with the groove following SAW actuation.

FIG. 3 shows cell-sorting performance of groove-enhanced devices. Sorting devices with slanted grooves reliably actuated cells for a wide range of operating conditions. The symbols on each plot in FIG. 3 are centered on the mean of the three independent threshold values, while the error bars depict the full range of threshold values. For points without visible error bars, the marker size exceeds the extent of the error bars. The length of the pulse necessary to deflect a given cell type increases as the applied RF power decreases. The device actuates both adherent Madin-Darby canine kidney (MDCK; open symbols) cells and non-adherent chronic myelogenous leukemia (K-562; filled symbols) cells with performance levels sufficient to achieve high speed cell sorting (FIG. 3A). As the flow rate is varied, the threshold power required for sorting increases, except at the lower range of flow rates, where it appears that there was a minimum amount of power necessary for sorting (FIG. 3B). The threshold power for sorting decreased linearly as the groove is widened (FIG. 3C). The threshold power changed non-monotonically as groove height was increased (FIG. 3D), but sorting takes place with the lowest required power for the tallest tested grooves.

Example 4

In this example, the groove-enhanced cell sorter was operated under realistic conditions by sorting fluorescent cells from a mixture of cells. In each experiment, a reference library was prepared with known cell density and fraction of fluorescent K-562 cells. The slanted groove sorter extracts only the fluorescent cells. The device was operated with two different sheath flow rates and two different groove widths to measure how these parameters will affect sorter performance. The purified sample was collected and the recovered cells are imaged using a confocal microscope to obtain an independent measurement of cell purity. To elucidate the dependence of purity of the sorted fraction on the event rate at which the sorter was operated, this process was repeated for reference libraries with a range of cell densities at the same sample flow rate. The sorter was able to achieve high purity at low event rates, but the purity decreased as the concentration of cells increases with a trend that appears linear, as shown in FIG. 4.

The overall trend fits to a line, which intersects the purity axis at 93% and which has a slope of −4.3% per kilohertz. Although this device used relatively high levels of SAW power, the viability of the sorted fraction of cells remains high, greater than 96%. At first glance, the entire data set fits adequately to a line, but the fit averages out any effects arising from operating the device under different flow rate conditions or using different groove widths.

To determine whether different flow rate conditions and groove widths have a minimal influence on the recovered sample purity, the data were binned first according to sheath flow rate and then by groove width, and examine the distributions of the residuals for each parameter—the difference between a given data point and the fit at that point. There was no clear difference between the purity for devices operated with different sheath flow rates, but the devices with a narrow 40 micrometers groove consistently extract higher purity samples than those with an 80 micrometer groove; this contrast is evident in the box plots shown in FIG. 4. However, it should be noted that sorting was nonetheless achieved with the 80 micrometer groove. The observation that the narrowest groove provides improved purity suggests that the groove acts as a spatial filter; only cells that enter the groove are carried across the sorting channel to the sorting outlet, and cells enter the groove if they are aligned with the groove when the acoustic wave is applied. This increases the likelihood that only the correct cell enters the groove. This effect offers an advantage compared to previous SAW sorting designs, in which the sorting purity can only be increased by changing the design of the SAW transducer or the operating flow rates.

Figure 4:
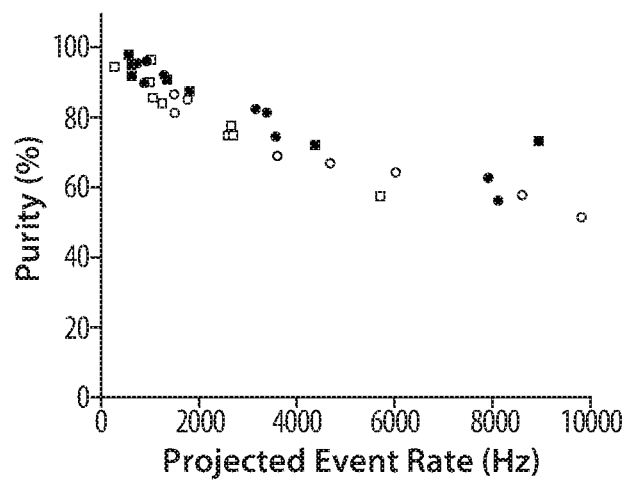
FIG. 4 illustrates sorting purities, in still another embodiment of the invention.

FIG. 4 illustrates cell purity v. event rate. The purity of each recovered sample is plotted relative to the event rate at which the sample is sorted. Filled symbols are used for samples sorted with a 40 micrometer groove device, while empty symbols represent samples sorted with the 80 micrometer groove. Square symbols represent data gathered with total sheath flow rates of 45 ml/h, and circles for sheath flow rates of 60 ml/h. All of the data sets follow the same general trend.

Figure 5A:
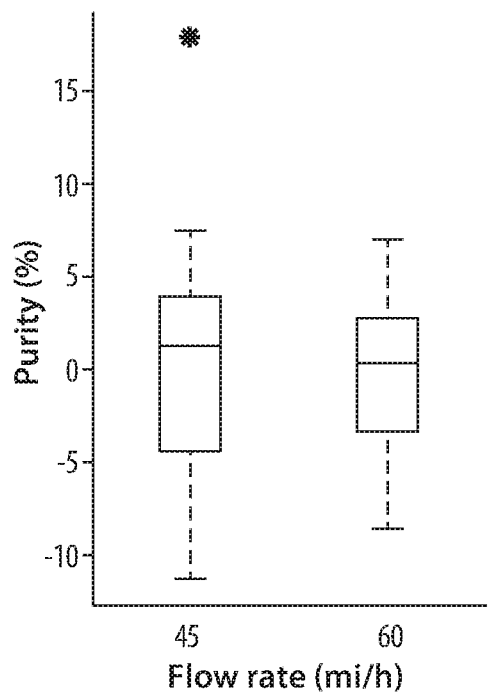
FIGS. 5A-5B illustrate variations in flow rate and groove width for devices in accordance with still other embodiments of the invention.
Figure 5B:
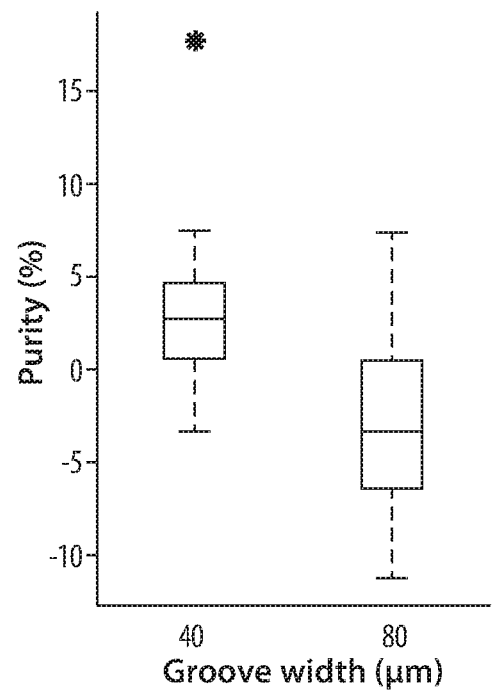

FIG. 5 illustrates residuals for variations in flow rate and groove width. For each data point, a residual value was determined, which measures the distance on the purity axis from a linear fit to the entire data set. The residual data is associated into groups based on the device operating parameters, and distributions of the residuals from the overall trend line are plotted as box and whisker plots for each group. The data are grouped according to the total sheath flow rate (FIG. 5A) and the slanted groove width (FIG. 5B). The median values, represented by the lines in the center of the boxes, are essentially identical for the two different flow rate conditions, while the devices with the narrower groove produce samples that are about 5% more pure than the larger groove on average.

Thus, the slanted groove-enhanced cell sorter discussed in the above examples represents one embodiment of microfluidic cell sorters using SAWs to sort cells rapidly to high levels of purity. The design used in these examples featured a novel mechanism for channeling the normal component of the acoustic wave into driving cell motion. The sorter operated at high rates, approaching those of commercial FACS instruments, and also could achieve high purity for recovery of enriched samples. Slanted groove SAW devices offer several routes to enhanced performance, because improvements in the designs of the IDT, the vertical flow-focusing nozzle, and the slanted groove itself can all be tuned and integrated to further increase overall performance. For example, tuning the nozzle design to reduce the spread in cell velocities could lead to increases in the sorting purity; inertial focusing devices could be used to align cells without the need for a multi-layer nozzle design; or fully sheath-less focusing techniques could be employed to eliminate the need for the sheath channels altogether. Likewise, the IDT design could be improved through the use of a focusing geometry, so that the power density is spread over a wider area, to reduce the chance that the IDT becomes damaged during use. Like other microfluidic cell sorters, the fluid handling region is enclosed and aerosols are not produced by the acoustic waves in the system; therefore, the sorter could find application in screening bio-hazardous samples without the need for additional containment measures. The current design is disposable, but to completely eliminate the risk of cross-contamination, the IDT also needs to be discarded or sterilized. This issue can be solved, for example, by bonding the PDMS flow channel to a PDMS membrane with a micro-fabricated post that channels the SAW from the IDT into the flow channel where it can deflect cells. Then the PDMS flow channel is fully disposable, while the IDT can be retained, all while maintaining sterile operating conditions. SAW cell sorters are also amenable to parallelization, in which multiple unit cells work together in parallel to produce a single sorter with enhanced aggregate performance. Each SAW unit cell requires only a few components, either a voltage-controlled oscillator, a RF switch, and an RF amplifier. By combining tens or hundreds of unit cells, a parallelized instrument could truly achieve unprecedented sorting rates. Moreover, the same SAW device platform is compatible with both cells and droplets, meaning a single instrument could provide users with both FACS and droplet sorting capabilities.

Example 5

This example, illustrates various experimental techniques used in the above examples.

Device Design. Drawings for both IDTs and microfluidic channels are created using AutoCAD (Autodesk, Inc., San Rafael, Calif.). The spacing of the fingers in the IDT design are chosen such that the resonant frequency varies linearly along the transducer between 161 and 171 MHz. Bus bars on either side of the IDT connect to square pads with 1.5 mm side length, through which external voltages are applied to all the IDT fingers with minimal resistance. Additional markings delimit each transducer so that the IDTs can be cut from the wafer into individual squares with 17.4 mm side length. The design is etched into a chrome mask (Photo-Sciences Inc., Torrance, Calif.) to ensure that the actual finger widths closely match the designed values. The microfluidic device has three layers, each fabricated using a separate lithographic mask. The first layer contains only the nozzle, because the nozzle is shallower than the rest of the device. The nozzle extends underneath both the cell inlet region and the sorting channel to ensure that the nozzle is insensitive to the alignment of subsequent layers. The nozzle is designed to be nominally 40 micrometers long reducing the chance that cells will clog the nozzle. Most of the other features are on the device's second layer, including the air gap for the fingers of the IDT, the sheath and cell inlets, the sorting channel, and the device outlets. The third layer only contains the slanted groove, which is patterned on top of the sorting channel. The groove is drawn 230 micrometers wide, slightly less than the full sorting channel width, ensuring that even if the groove is slightly misaligned from the sorting channel, the wall of the channel where the acoustic wave encounters the liquid will not be distorted. Distortions of the channel wall could refract the acoustic wave at unexpected angles. Each layer contains at least two sets of alignment marks consisting of an asymmetrical pattern of crosses, enabling different layers to be aligned precisely to the same position. The masks for the individual microfluidic device layers are ordered from CAD/Art Services, Inc. (Bandon, Oreg.) and imaged with a resolution of 25,400 dpi.

Transducer Fabrication. Interdigital transducers are fabricated using a lift-off process, described in the protocol from the Center for Nanoscale Systems at Harvard University. The substrates are black lithium niobate wafers (Precision Micro-Optics, LLC, Woburn, Mass.) with 4 inch diameter and 128° Y-cut. Black lithium niobate is effective in SAW applications and exhibits less pyroelectric effect, making it easier to handle. The wafers are cleaned on the spin coater using acetone, then isopropanol, and spun dry. Residual moisture is removed with a dehydration bake at 180° C. for 1 minute. The rate of temperature change was eased by placing the wafer on a hot plate at 115° C. for 1 minute just prior to and immediately following baking at 180° C. Resist is dispensed onto the wafer using a disposable dropper. A layer of LOR3A resist (MicroChem, Westborough, Mass.) is added to the wafer surface; then, the wafer is spun at 4000 rpm to create a layer 300 nm thick. The resist was baked at 180° C. for 4 minutes, using the same temperature ramping method as the dehydration bake. A layer of Shipley 1805 (MicroChem, Westborough, Mass.) was added and spun at 4000 rpm. This layer was baked for 1 minute at 115° C. The photoresists were patterned using the IDT chrome mask on a mask aligner (MJB4, Karl Suss, Garching, Germany). The pattern was developed by immersing the wafer in CD-26 developer (Microposit, Austin, Tex.) for 75 s to form a shadow mask for E-beam deposition. The wafer was rinsed clean with water and blown dry with nitrogen. The exposed surface of the wafer was cleaned using an oxygen plasma cleaner (SCE106, Anatech, Union City, Calif.) with 75 W of RF power and an oxygen gas flow rate of 40 sccm for 20 s. 10 nm of titanium was deposited as an adhesion layer, followed by 50 nm of gold using an E-beam evaporator (Denton Vacuum LLC, Moorestown, N.J.) to form electrodes on the wafer surface. The photoresist was then lifted off by soaking the wafer in Remover-PG (MicroChem, Westborough, Mass.) at 80° C. for about 60 minutes. A layer of Shipley 1813 was added, and baked at 115° C. for 1 minute to form a protective layer. The patterned substrates was scored using a dicing saw (Disco DAD321, Tokyo, JPN) to make cuts 250 micrometers deep in the lithium niobate. The wafer broke cleanly along the scored lines, yielding up to 21 devices per wafer. The IDTs were cleaned with acetone to remove the protective layer prior to use.

Soft lithography. Multi-layer lithography was performed to create molds for PDMS replicas. The layers were processed following the method recommended in the manufacturer's data sheet for SU-8 3025 resist (MicroChem, Westborough, Mass.). For each layer, a small amount of resist was dispensed onto the wafer. The wafer was spun at 3000 rpm to create a layer of resist that was 25 micrometers thick. Each layer was pre-baked for a total of 12 minutes at 95° C., rotating the wafer on the hot plate after half the bake time has elapsed. The layer was then aligned to any underlying features and expose new features using a mask aligner (ABM, Scotts Valley, Calif.). The resist was then baked for 1 minute at 65° C. and 5 minutes at 95° C. At this point, additional layers could be added on top of the previous ones. Once all layers were exposed and all baking steps were complete, the features were developed by immersing the wafer in polyethylene glycol monomethyl ether acetate for 5 minutes using an orbital shaker (Roto Mix 8×8, Thermo Fisher, Waltham, Mass.) to agitate the developer. After developing, the wafer was rinsed with isopropanol and blown dry with nitrogen. The wafer now served as a mold for creating replicas in PDMS. PDMS (Sylgard 184, Dow-Corning, Midland, Mich.) base and cross-linker was mixed in a 10:1 ratio using a Thinky mixer (AR-100, Thinky Corporation, Tokyo, Japan). The mixer was run in mixing mode for 30 s and degassing mode for another 30 s. The mold was placed in a plastic petri dish and the uncured PDMS poured on top. The PDMS was degassed for 10 minutes, then place the dish in an oven at 65° C. overnight. Once the PDMS is cured, the edges of the wafer were cut around using a scalpel and the PDMS replica lifted out of the mold. Each PDMS replica contained 16 independent devices; the replica was cut into individual flow channels prior to use. Interface holes were created with a biopsy punch (Uni-Core, GE Healthcare Life Sciences, Pittsburgh, Pa.). 0.75 mm diameter holes were used for the inlets and 1.5 mm diameter holes used for the outlets. Once the interface holes were formed, individual PDMS flow channels could be mounted into the sample holder.

Sorting Apparatus. The microscope body of the sorting apparatus was built from modular optical components. Fluorescence was excited by a 473 nm laser (Laserglow Technologies, Toronto, ON) with 100 mW output. The laser beam was expanded by a beam expander (BE-05-10-A, Thorlabs Inc., Newton, N.J.), and steered into the body of the microscope. Excitation light reflected off the excitation dichroic (FF495-Di03-25x36, Semrock, Inc., Buffalo, N.Y.) and up through the objective. A cylindrical achromat (ACY254-200-A, Thorlabs Inc., Newton, N.J.) focused one axis of the beam into a line in the back aperture of a microscope objective (Nikon 10x/0.45 NA). The objective focused the excitation light into a line in the microscope's focal plane and collected any resulting fluorescence emission from the sample. The emitted fluorescence passed through the excitation dichroic, but reflected off the fluorescence dichroic (FF605-Di01-25x36, Semrock, Inc., Buffalo, N.Y.); the fluorescence passed through a colored glass longpass filter (FGL495, Thorlabs Inc., Newton, N.J.) and a dielectric bandpass filter (FF01-520/44-25, Semrock, Inc., Buffalo, N.Y.) illuminating the photocathode of a photomultiplier tube (H10723-20, Hamamatsu Photonics K.K., Hamamatsu, Japan), while noise sources of light were attenuated by the filters. The microscope's field of view was illuminated using an infrared light emitting diode. The infrared light passed through both of the microscope's dichroic filters, and reflected from a turning mirror (CM1-P01, Thorlabs Inc.). The infrared image was focused onto the sensor of a fast camera (HiSpec1, Fastec Imaging, San Diego, Calif.) by a tube lens (AC254-100-B-ML, Thorlabs Inc.) to allow videos of the sorting process to be recorded at high speed. A Leica manual stage completed the microscope by providing fine adjustment of the sample position with respect to the optical system.

The fluorescence from cells passing through the channel was analyzed in real time and a RF pulse was applied to the transducer to sort desired cells with minimal latency. The photomultiplier tube module measured the intensity of light in the accepted wavelength range and generated a voltage proportional to the intensity of the incident light. This voltage was digitized by the data acquisition card (PCIe-7842R, National Instruments Corp., Austin, Tex.) and analyzed in real time using the on-board field programmable gate array to extract the details of the fluorescence peak and generate the sorting pulse for desired peaks. Instrument settings and plots of the instrument performance were read out on the associated PC. Here, the sorting pulse was a 5V signal used to modulate the output of a waveform generator (SMB100A, Rohde & Schwarz, Munich, Germany) through its pulse modulation input. The output of the waveform generator was intensified using a high gain RF amplifier (LZY-22+, Mini-Circuits, Brooklyn, N.Y.). The amplified RF signal drove the IDT to generate the SAW.

A custom-made sample holder supported the groove enhanced device. A printed circuit board (PCB) was connected to the RF amplifier using an MMCX male card edge connector. The PCB was held in place by fixing it to a mechanical base plate using M3 screws. Electrical connections from the PCB to the IDT were created, when pogo pins mounted on the board were pressed into contact with metal pads on the surface of the transducer. An acrylic spacer milled to 3.7 mm and laser cut to match the accommodate the mounting holes ensured that the pins exerted enough force to hold the IDT in place and make consistent electrical contact, but not so much force that the substrate cracked under the stress. Each PDMS device was bonded to the substrate using mechanical force. The PDMS replica contained three sides of the device's flow channel, while the lithium niobate substrate formed the bottom of the flow channel. A 6 mm sheet of acrylic was laser cut to permit fluid connections to pass through the sheet. The acrylic pressed the PDMS onto the substrate using M2 screws to couple the acrylic layer to the baseplate. Once assembled, the entire sample holder fit into the microscope stage.

Characterization experiments. Madin Darby canine kidney (MDCK) and human chronic myelogenous leukemia (K-562, ATCC, Manassas, Va.) cells were harvested prior to each day's experiments. The MDCKs have fluorescent nuclei, having been stably transfected with green fluorescent protein fused to a nuclear localization sequence, while the K-562 cells were stained by adding calcein AM (Life Technologies, Grand Island, N.Y.) to the cell suspension at a concentration of 1 micromolar and incubated the suspension at 37° C. for 20 minutes. The cells were re-suspended into injection buffer at between 5 and 10 million cells per ml. The injection buffer was 18% Optiprep (D1556, Sigma-Aldrich Co. LLC, St. Louis, Mo.) by volume, 6 U/ml DNAse I (New England Biolabs Inc., Ipwich, Mass.), 3 micromolar magnesium chloride and 1× phosphate buffered saline.

Unless otherwise specified, the testing conditions were applied to a device with a slanted groove that was 120 micrometers wide, and whose long axis was tilted 60° from the overall direction of flow. Sheathes of 1× phosphate-buffered saline (PBS, P3813, Sigma-Aldrich Co. LLC, St. Louis, Mo.) were used. The total sheath flow rate was typically 45 ml/h, with a quarter of the flow coming from the sheath inlet closer to the waste channel and three quarters of the flow from the sheath inlet on the retention side of the device. The cell phase flow rate was 0.5 ml/h. The frequency of the RF pulse was usually kept constant at 163.1 MHz, but when the groove width changes, then the frequency was varied to ensure that the SAW actuation aligned with the groove. Prior to testing the sorting performance for each distinct condition, control experiments were run to ensure that cells were not sorted, when the instrument was triggered but no acoustic wave was applied. Each characterization experiment varied only one element of the standard conditions at a time, and each condition was tested on three independent days of experiment. As mentioned previously, fast movies of individual sorting events were analyzed to determine whether a cell was successfully deflected across the sorting channel into the retention outlet or not.

Sorting experiments. As detailed for the characterization experiments, K-562 cells were harvested from culture just prior to conducting the experiment. To create reference libraries of cells, the sample of cells were mixed carefully and 10% of the cell suspension by volume was collected. This fraction of the cells was stained with calcein AM at 1 micromolar for 20 minutes at 37° C., while the remaining cells remained unstained. The two fractions were then combined and the cells re-suspended in injection buffer at the target cell density.

The cells were sorted using a slanted groove sorting device. A standard nozzle geometry and an RF pulse with 38.26 dBm of instantaneous power and 100 microsecond duration at 164.1 MHz was used. The flow rate of the cell suspension was kept constant at 0.5 ml/h. The device was operated with a range of cell densities to create test different event rates. Over the entire cell density range, the purity from devices operating at two different sheath flow rates, 45 ml/h and 60 ml/h was measured, and using two different groove widths, 40 micrometers and 80 micrometers, under the same sorting conditions. Here, the sheath flow was also 1X PBS. The actual rate of fluorescent events was measured by the sorting instrument and the projected total event rate was obtained by dividing this by the measured purity of the initial reference library. The thresholds for sorting were set to ensure that pulses were only applied when only a single fluorescent cell was expected to be present in the channel, by ignoring the lower and upper extremes of fluorescence. In addition, when the sorting rate is high, the sorting thresholds were further limited to set the sorting rate below 500 events/s, reducing the chance that the IDT will be damaged irreparably. However, this limit was somewhat arbitrarily set.

The fluorescence of the cells recovered from the retention outlet was measured using a confocal microscope (SP5, Leica Microsystems Inc., Buffalo Grove, Ill.). In addition to using calcein to measure the proportion of labelled cells in the recovered sample, DRAQ5 (Life Technologies, Grand Island, N.Y.) was added at a final concentration of 500 nM to label the DNA of all cells present in each sample. To measure cell viability after sorting, ethidium homodimer (Life Technologies, Grand Island, N.Y.) was added to 2 micromolar final concentration and the cells incubated for 20 minutes at 37° C. The images were analyzed using a custom Matlab (The Mathworks, Inc., Natick, Mass.) script to detect fluorescence in the three separate fluorescence channels. The purity of the sorted fraction was determined by determining the ratio of cells labeled with calcein to total number of cells, and the viability was determined as the complement of the ratio of dead cells to total cells.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B)
in another embodiment, to B only (optionally including elements other than A)
in yet another embodiment, to both A and B (optionally including other elements) etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B)
in another embodiment, to at least one, optionally including more than one, B, with no A present (and optionally including elements other than A)
in yet another embodiment, to at least one, optionally including more than one, A, and at least one, optionally including more than one, B (and optionally including other elements) etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus, comprising:
   (1) a microfluidic channel comprising an inlet, a first outlet, and a second outlet;
       wherein said microfluidic channel comprises a groove in a first surface of said microfluidic channel;
       wherein said groove is connected to said second outlet in a second surface of said microfluidic channel, and is positioned at a non-zero and non-orthogonal angle with respect to the direction of fluid flow in the microfluidic channel; and
       wherein the direction of fluid flow in the microfluidic channel is from said inlet to said first and second outlet;
   (2) an acoustic wave generator positioned proximate to a second surface of said microfluidic channel and proximate to said groove; and
   (3) a flow-focusing nozzle, wherein said flow-focusing nozzle is paired with said groove, wherein said flow-focusing nozzle is positioned offset from a midline of said microfluidic channel and configured to focus fluid flowing therethrough onto a surface of the microfluidic channel opposite of the first surface.

2. The apparatus of claim 1, wherein the cross-sectional dimension of the groove, measured perpendicular to the direction of fluid flow within the groove, is at least about 20 micrometers and less than 40 micrometers.

3. The apparatus of claim 1, wherein the acoustic wave generator comprises one or more interdigitated transducers, wherein at least one of the one or more interdigitated transducers has a finger spacing of between about 20 micrometers and about 30 micrometers.

4. The apparatus of claim 3, wherein at least one of the one or more interdigitated transducers comprise a first electrode and a second electrode that are interdigitated with each other.

5. The apparatus of claim 1, wherein the microfluidic channel is coupled to a piezoelectric substrate.

6. The apparatus of claim 5, wherein the piezoelectric substrate comprises $LiNbO_3$.

7. The apparatus of claim 1,
   wherein acoustic waves generated by the acoustic wave generator are applied to the second surface of the microfluidic channel.

8. A sorting method, comprising:
flowing a species contained in a fluid within the microfluidic channel of claim 1; and
applying acoustic waves to deflect the species to enter the groove and thus to enter the second outlet.

9. The method of claim 8, wherein the deflection of the species has an axial component defined by propagation of the acoustic waves from the acoustic wave generator and a lateral component defined substantially orthogonally thereto, wherein the lateral component is at least 2 times greater than the axial component.

10. The method of claim 8, wherein the deflection of the species has an axial component defined by propagation of the acoustic waves from the acoustic wave generator and a lateral component defined substantially orthogonally thereto, wherein the lateral component is at least 30 times greater than the axial component.

11. The method of claim 8, wherein the groove has a cross-sectional dimension that is less than a parallel cross-sectional dimension of the microfluidic channel adjacent the groove.

12. The method of claim 8, wherein said microfluidic channel has a cross-sectional dimension of no more than 1 mm.

13. The method of claim 8, wherein the acoustic waves have a power of at least about 3 dBm.

14. The method of claim 8, wherein acoustic waves generated by the acoustic wave generator have an average frequency of between about 130 MHz and about 160 MHz.

15. The method of claim 8, wherein acoustic waves generated by the acoustic wave generator are applied substantially orthogonally to a direction of the flow of the species within the microfluidic channel.

* * * * *